(12) United States Patent
Rusanovskyy et al.

(10) Patent No.: US 11,792,412 B2
(45) Date of Patent: Oct. 17, 2023

(54) ADAPTIVE LOOP FILTERING FOR COLOR FORMAT SUPPORT

(71) Applicant: QUALCOMM Incorporated, San Diego, CA (US)

(72) Inventors: Dmytro Rusanovskyy, San Diego, CA (US); Yan Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/230,823

(22) Filed: Apr. 14, 2021

(65) Prior Publication Data

US 2021/0329272 A1   Oct. 21, 2021

Related U.S. Application Data

(60) Provisional application No. 63/010,668, filed on Apr. 15, 2020.

(51) Int. Cl.
*H04N 19/186* (2014.01)
*H04N 19/117* (2014.01)
(Continued)

(52) U.S. Cl.
CPC ......... *H04N 19/186* (2014.11); *H04N 19/117* (2014.11); *H04N 19/174* (2014.11); *H04N 19/184* (2014.11)

(58) Field of Classification Search
CPC ... H04N 19/186; H04N 19/117; H04N 19/174
(Continued)

(56) References Cited

U.S. PATENT DOCUMENTS

2013/0101018 A1\* 4/2013 Chong .................. H04N 19/82
375/E7.026
2021/0168406 A1\* 6/2021 Li ....................... H04N 19/184
(Continued)

OTHER PUBLICATIONS

Chubach O., et al., "CE5-Related: On the Syntax Constraints of ALF APS," 15. JVET Meeting; Jul. 3, 2019- Jul. 12, 2019; Gothenburg; (The Joint Video Exploration Team of ISO/IEC JTC1/SC29/WG11 and ITU-T SG.16), No. JVET-O0288, m48398, Jun. 25, 2019 (Jun. 25, 2019), XP030219110, 5 pages, Retrieved from the Internet: URL: http://phenix.int-evry.fr/jvet/doc_end_user/documents/15_Gothenburg/wg11/JVET-O0288-v1.zip JVET-O0288-v1.docx [retrieved on Jun. 25, 2019] Abstract. Introduction and Proposed method, p. 1, paragraph 1—p. 2, paragraph 2.

(Continued)

*Primary Examiner* — Amir Shahnami
(74) *Attorney, Agent, or Firm* — QUALCOMM Incorporated; Espartaco Diaz Hidalgo

(57) ABSTRACT

Systems and techniques are described herein for processing video data. For example, a process can include obtaining a video bitstream, the video bitstream including adaptive loop filter (ALF) data. The process can further include determining a value of an ALF chroma filter signal flag from the ALF data, the value of the ALF chroma filter signal flag indicating whether chroma ALF filter data is signaled in the video bitstream. The process can further include processing at least a portion of a slice of video data based on the value of the ALF chroma filter signal flag.

22 Claims, 14 Drawing Sheets

(51) Int. Cl.
*H04N 19/174* (2014.01)
*H04N 19/184* (2014.01)

(58) Field of Classification Search
USPC .......................................................... 375/240
See application file for complete search history.

(56) References Cited

U.S. PATENT DOCUMENTS

2021/0211700 A1* 7/2021 Li ...................... H04N 19/189
2022/0132114 A1* 4/2022 Paluri ................. H04N 19/186

OTHER PUBLICATIONS

International Search Report and Written Opinion—PCT/US2021/027545—ISA/EPO—dated Jun. 11, 2021.
"Potential Future Improvement of Essential Video Coding," 129. MPEG Meeting, Jun. 13, 2020-Jan. 17, 2020, Brussels, (Motion Picture Expert Group or ISO/IEC JTC1/SC29/WG11), No. n18984, Mar. 13, 2020, XP030285321, Retrieved from the Internet: URL: http://phenix.int-evry.fr/mpeg/doc_end_user/documents/129_Brussels/wg11/w18984.zipw18984-Potential-Future Improvement of Essential Video Coding.docx [retrieved on Mar. 13, 2020] p. 5, paragraph 3.59—paragraph 3.60 p. 33, paragraph 7.3.4—p. 34 p. 35, paragraph 7.3.5—p. 36 p. 68-69.

* cited by examiner

ADAPTIVE LOOP FILTERING FOR COLOR FORMAT SUPPORT

CROSS-REFERENCE TO RELATED APPLICATIONS

This application claims the benefit of U.S. Provisional Application No. 63/010,668 filed Apr. 15, 2020, which is hereby incorporated by reference for all purposes.

FIELD

The present application is related to video coding. For example, aspects of the application relate to systems, apparatuses, methods, and computer-readable media (referred to as "systems and techniques") for improving loop filters, such as adaptive loop filters (ALF). In some examples, the systems and techniques can enable coding (e.g., encoding and/or decoding) of video data with different color formats (e.g., a 4:4:4 color format, a 4:2:0 color format, and/or other color formats).

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding Standards. For example, video coding Standards include versatile video coding (VVC), high-efficiency video coding (HEVC), advanced video coding (AVC), moving picture experts group (MPEG) coding, VP9, Alliance of Open Media (AOMedia) Video 1 (AV1), among others. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content. In certain video coding Standards (e.g., the essential video coding (EVC) Standard), adaptive loop filters (ALF) filter luma components with adaptive filter banks and classifiers, such that a filter pre-stored in memory or signaled (e.g., via an adaptive parameter set (APS)) is identified and used for ALF filtering. Chroma components of a bitstream are filtered with a single filter (e.g., a 5×5 filter), with coefficients for the filter signaled once per APS. The operations of such video coding Standards, however, lack flexibility and may not be efficient for video where different color channels have similar characteristics (e.g., video data having a red-green-blue (RGB) format with a red component, a greed component, and a blue component per pixel, video data having luma and chroma components per pixel such in a 4:4:4 format video data, or other video data). In such formats where the color components have similar characteristics, color component data that is not subject to ALF filtering in the above described video coding Standards may benefit from the ALF filtering. The syntax elements of some video coding Standards, however, signal ALF chroma identifiers in the APS (e.g., using one or more APS syntax elements). Using APS syntax elements to control ALF filtering over chroma components lacks flexibility.

Examples described herein add a flag associated with ALF filtering of multiple color components (e.g., an added ALF chroma flag in addition to an existing ALF luma flag) to APS signaling. In some cases, ALF chroma identifiers used to indicate chroma ALF filtering are included in slice header data (e.g., using syntax structures described below) rather than being included in ALF data (e.g., signaled using an alf_data syntax structure, as described herein). Using slice header data for chroma ALF filter signaling can improve the operation of video coding devices (e.g., encoding devices, decoding devices, or combined encoding-decoding devices) with improved flexibility in ALF filtering. Using slice header data for chroma ALF filter signaling can also improve video output performance (e.g., for chroma data in video formats where chroma and luma have similar characteristics). In some examples, the ALF flag signaling can be used to apply ALF filtering and identify ALF maps for ALF filtering for certain color components (e.g., blocks of video data which carry certain color component specific data) of video data (e.g., in slices of pictures of the video data). For instance, a decoder receiving a bitstream including video data having a 4:4:4 format can identify the presence of an ALF flag (e.g., an ALF chroma filter signal flag) in the bitstream. The ALF flag can indicate that chroma ALF filtering is available for a slice of a picture of the video data. Additional information in the bitstream can indicate ALF maps (e.g., slice_alf_chroma_map_signalled, slice_alf_chroma2_map_signalled, etc.) which provide information used in the ALF filtering of at least the portion of the slice.

According to one illustrative example, an apparatus for decoding video data is provided. The apparatus comprises a memory and at least one processor (e.g., configured in circuitry) coupled to the memory. The at least one processor is configured to: obtain a video bitstream, the video bitstream including adaptive loop filter (ALF) data; determine a value of an ALF chroma filter signal flag from the ALF data, the value of the ALF chroma filter signal flag indicating whether chroma ALF filter data is signaled in the video bitstream; and process at least a portion of a slice of video data based on the value of the ALF chroma filter signal flag.

According to another illustrative example, a method of decoding video data is provided. The method comprises: obtaining a video bitstream, the video bitstream including adaptive loop filter (ALF) data; determining a value of an ALF chroma filter signal flag from the ALF data, the value of the ALF chroma filter signal flag indicating whether chroma ALF filter data is signaled in the video bitstream; and processing at least a portion of a slice of video data based on the value of the ALF chroma filter signal flag.

In another example, a non-transitory computer-readable medium is provided that has stored thereon instructions that, when executed by one or more processors, cause the one or more processors to: obtain a video bitstream, the video bitstream including adaptive loop filter (ALF) data; determine a value of an ALF chroma filter signal flag from the ALF data, the value of the ALF chroma filter signal flag indicating whether chroma ALF filter data is signaled in the video bitstream; and process at least a portion of a slice of video data based on the value of the ALF chroma filter signal flag.

In another example, an apparatus for decoding video data is provided. The apparatus includes: means for obtaining a video bitstream, the video bitstream including adaptive loop filter (ALF) data; means for determining a value of an ALF chroma filter signal flag from the ALF data, the value of the ALF chroma filter signal flag indicating whether chroma ALF filter data is signaled in the video bitstream; and means for processing at least a portion of a slice of video data based on the value of the ALF chroma filter signal flag.

Some aspects of the methods, apparatuses, and computer-readable medium described above include: obtaining a slice header for the slice of video data from the video bitstream; determining a value of an ALF chroma identifier from the slice header, the value of the ALF chroma identifier indicating whether an ALF can be applied to one or more chroma components of the slice; and processing at least the portion of the slice based on the ALF chroma identifier from the slice header.

Some aspects of the methods, apparatuses, and computer-readable medium described above include: determining a value of a chroma format identifier from the slice header, the value of the chroma format identifier and the value of the ALF chroma identifier indicating which chroma component of the one or more chroma components the ALF is applicable.

In some aspects, the value of the ALF chroma filter signal flag indicates that the chroma ALF filter data is signaled in the video bitstream. In some aspects, the chroma ALF filter data is signaled in an adaptation parameter set (APS) for processing at least the portion of the slice.

Some aspects of the methods, apparatuses, and computer-readable medium described above include: based on the value of the ALF chroma filter signal flag, obtaining the chroma ALF filter data to be used for processing at least the portion of the slice of video data; and applying the chroma ALF filter data to at least the portion of the slice of video data.

Some aspects of the methods, apparatuses, and computer-readable medium described above include inferring that the value of the ALF chroma filter signal flag is zero when the value of the ALF chroma filter signal flag is not present in the ALF data.

Some aspects of the methods, apparatuses, and computer-readable medium described above include: based on the value of the ALF chroma filter signal flag, obtaining luma ALF filter data to be used for one or more chroma components of at least one block of the video bitstream; and applying the luma ALF filter data to the one or more chroma components of the at least one block of the video bitstream.

Some aspects of the methods, apparatuses, and computer-readable medium described above include: obtaining a slice header for the slice of video data from the video bitstream; determining a value of a chroma format identifier from the slice header; and based on the value of the chroma format identifier from the slice header, processing one or more chroma components of at least one block of the video bitstream using luma ALF filter data.

Some aspects of the methods, apparatuses, and computer-readable medium described above include: processing the value of the ALF chroma filter signal flag from the ALF data to determine that the chroma ALF filter data is signaled in the video bitstream.

Some aspects of the methods, apparatuses, and computer-readable medium described above include: determining an ALF application parameter set (APS) identifier for a first color component of at least the portion of the slice; and determining an ALF map for the first color component of at least the portion of the slice.

Some aspects of the methods, apparatuses, and computer-readable medium described above include: enabling ALF filtering for at least two non-luma components of at least the portion of the slice based on components of at least the portion of the slice including shared characteristics.

In some aspects, the at least two non-luma components of at least the portion of the slice comprise a red component, a green component, and a blue component of at least the portion of the slice.

In some aspects, the at least two non-luma components of at least the portion of the slice comprise chroma components of at least the portion of the slice.

In some aspects, at least the portion of the slice includes 4:4:4 format video data.

Some aspects of the methods, apparatuses, and computer-readable medium described above include: enabling ALF filtering for at least two non-luma components of at least the portion of the slice based on at least the portion of the slice including non-4:2:0 format video data.

Some aspects of the methods, apparatuses, and computer-readable medium described above include: determining a chroma type array variable for at least the portion of the slice; determining an ALF chroma application parameter set (APS) identifier for a first component of at least the portion of the slice based on the chroma type array variable for at least the portion of the slice; and determining a signaled ALF map for the first component of at least the portion of the slice.

Some aspects of the methods, apparatuses, and computer-readable medium described above include: determining a second signaled ALF map for a second component of at least the portion of the slice based on the chroma type array variable.

Some aspects of the methods, apparatuses, and computer-readable medium described above include: performing ALF filtering on the first component and the second component of at least the portion of the slice using the signaled ALF map and the second signaled ALF map.

Some aspects of the methods, apparatuses, and computer-readable medium described above include: determining a third signaled ALF map for a third component of at least the portion of the slice based on the chroma type array variable.

In some aspects, the first component is a luma component, the second component is a first chroma component, and the third component is a second chroma component.

In some aspects, the first component is a red component, the second component is a green component, and the third component is a blue component.

Some aspects of the methods, apparatuses, and computer-readable medium described above include: performing ALF processing on a block for each component of at least the portion of the slice based on the chroma type array variable.

According to another illustrative example, an apparatus for encoding video data is provided. The apparatus comprises a memory and at least one processor (e.g., configured in circuitry) coupled to the memory. The at least one processor is configured to: generate adaptive loop filter (ALF) data; determine a value of an ALF chroma filter signal flag for the ALF data, the value of the ALF chroma filter signal flag indicating whether chroma ALF filter data is signaled in a video bitstream; and generate the video bitstream including the ALF data.

According to another illustrative example, a method of encoding video data is provided. The method comprises: generating adaptive loop filter (ALF) data; determining a value of an ALF chroma filter signal flag for the ALF data, the value of the ALF chroma filter signal flag indicating whether chroma ALF filter data is signaled in a video bitstream; and generating the video bitstream including the ALF data.

In another example, a non-transitory computer-readable medium is provided that has stored thereon instructions that, when executed by one or more processors, cause the one or more processors to: generate adaptive loop filter (ALF) data; determine a value of an ALF chroma filter signal flag for the ALF data, the value of the ALF chroma filter signal flag indicating whether chroma ALF filter data is signaled in a video bitstream; and generate the video bitstream including the ALF data.

In another example, an apparatus for encoding video data is provided. The apparatus includes: means for generating adaptive loop filter (ALF) data; means for determining a value of an ALF chroma filter signal flag for the ALF data, the value of the ALF chroma filter signal flag indicating whether chroma ALF filter data is signaled in a video bitstream; and means for generating the video bitstream including the ALF data.

Some aspects of the methods, apparatuses, and computer-readable medium described above for encoding video data include: determining a value of an ALF chroma identifier, the value of the ALF chroma identifier indicating whether an ALF can be applied to one or more chroma components of a slice of video data; and including the value of the ALF chroma identifier in a slice header of the video bitstream.

Some aspects of the methods, apparatuses, and computer-readable medium described above for encoding video data include: determining a value of a chroma format identifier, the value of the chroma format identifier and the value of the ALF chroma identifier indicating which chroma component of the one or more chroma components the ALF is applicable; and including the value of the chroma format identifier in the slice header of the video bitstream.

In some aspects, the value of the ALF chroma filter signal flag indicates that the chroma ALF filter data is signaled in the video bitstream. In some aspects, the chroma ALF filter data is signaled in an adaptation parameter set (APS) for processing at least the portion of the slice.

Some aspects of the methods, apparatuses, and computer-readable medium described above for encoding video data include: determining a value of a chroma format identifier, wherein the value of the chroma format identifier indicates one or more chroma components of at least one block of the video bitstream to process using luma ALF filter data; and including the value of the chroma format identifier in a slice header of the video bitstream.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

Figure 3A:
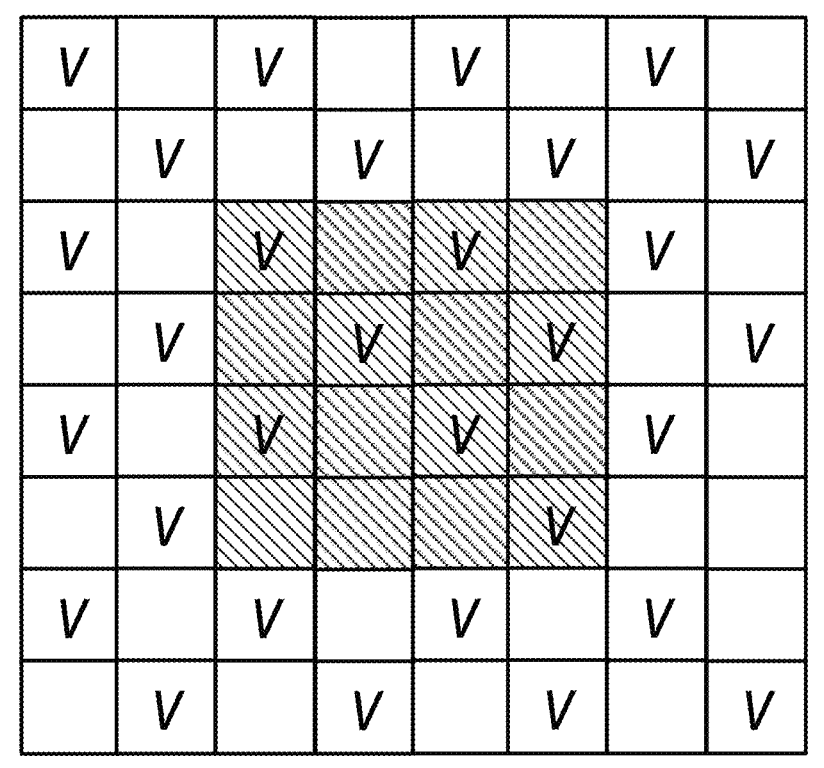
Figure 3B:
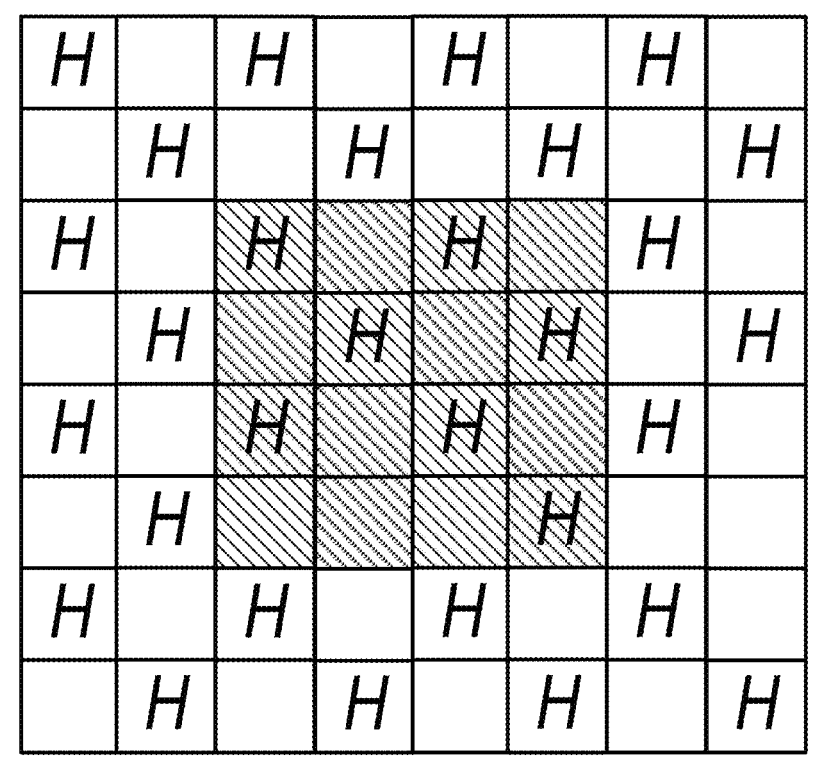
Figure 3C:
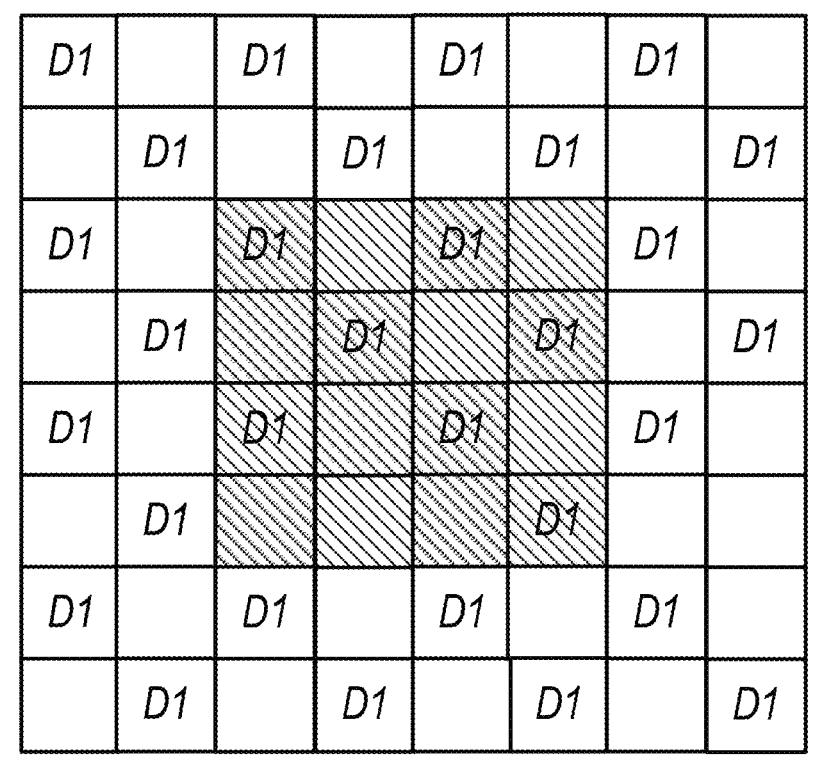
Figure 3D:
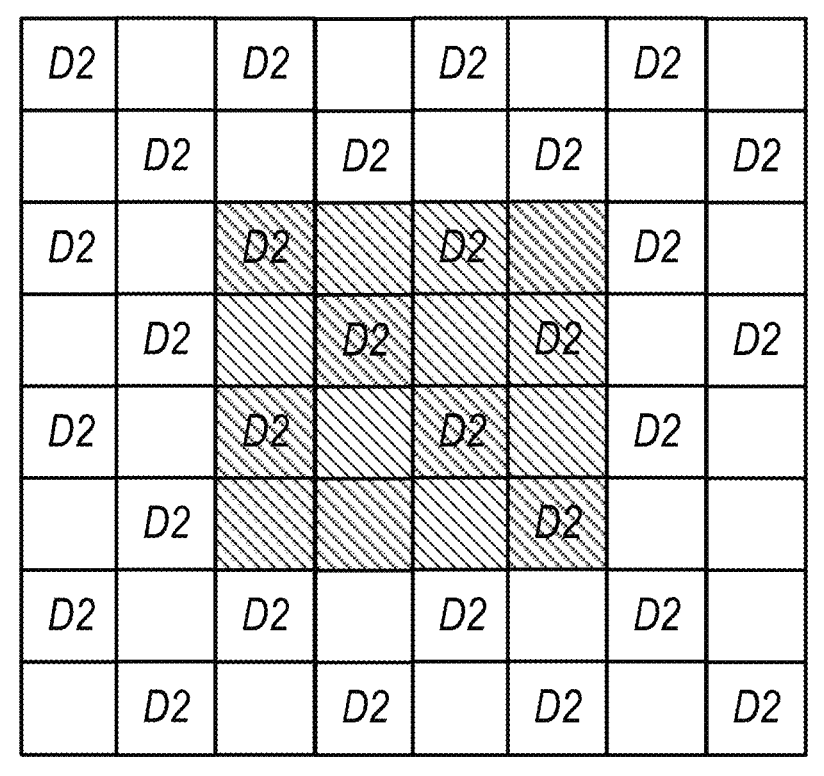

FIG. 3A is a conceptual diagram illustrating aspects of subsampled positions for vertical gradients, in accordance with some examples;

FIG. 3B is a conceptual diagram illustrating aspects of subsampled positions for horizontal gradients, in accordance with some examples;

FIG. 3C is a conceptual diagram illustrating aspects of subsampled positions for diagonal gradients, in accordance with some examples;

FIG. 3D is a conceptual diagram illustrating aspects of subsampled positions for diagonal gradients, in accordance with some examples;

DETAILED DESCRIPTION

Figure 1A:
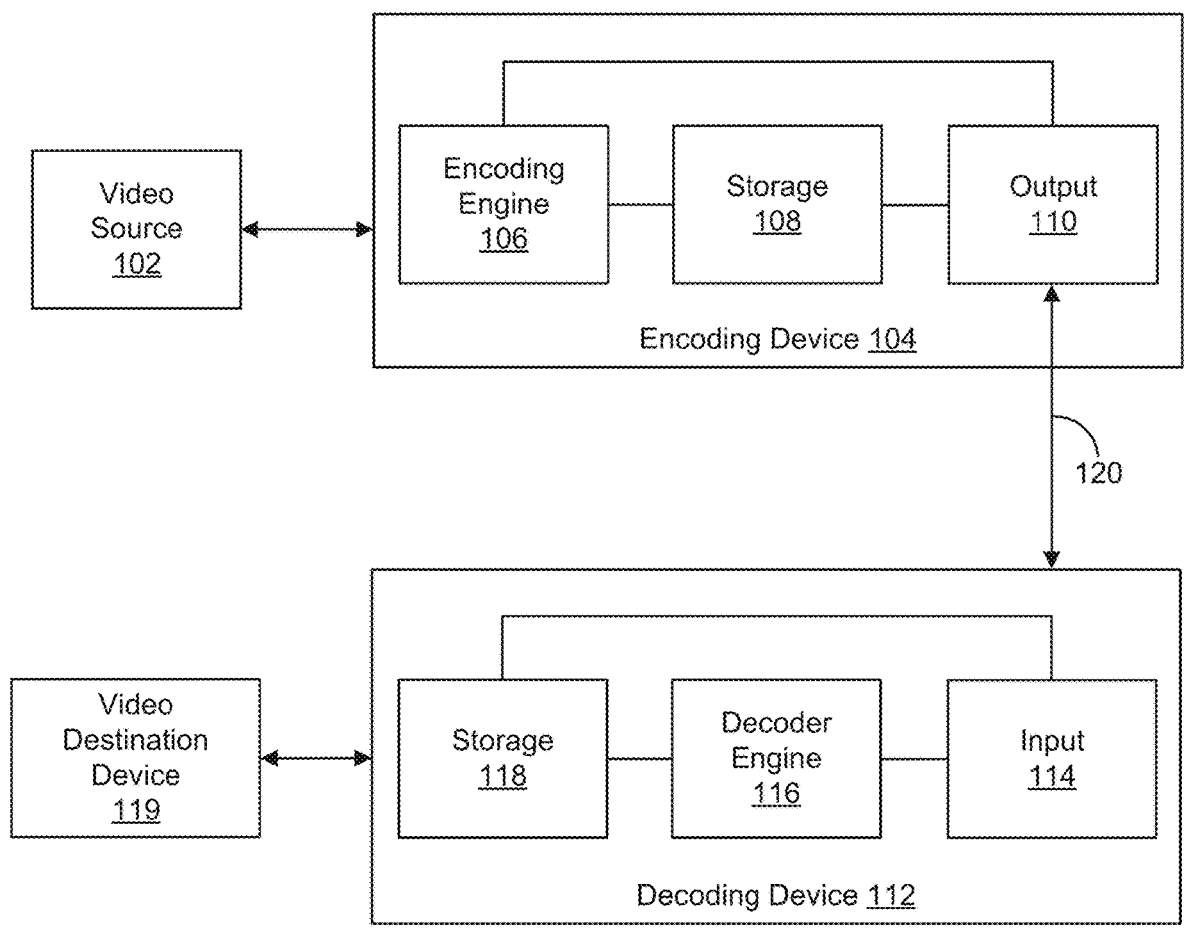
FIG. 1A is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units. Blocks can include coding tree blocks (CTBs), prediction blocks, transform blocks, and/or other suitable blocks. References generally to a "block," unless otherwise specified, may refer to such video blocks (e.g., CTBs, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to. In some standards, coding tree blocks (CTBs) make up CTUs and are structured to carry individual color components of video data. For example, a CTU may include a first CTB for luma components of the CTU, a second CTB for chroma-blue (Cb) components of the CTU, a third CTB for chroma-red (Cr) components of the CTU.

The video blocks may be encoded using a particular prediction mode. For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction error can be determined as the difference between the pixel values in the block being encoded and the predicted block. The prediction error can also be referred to as the residual. The video encoder may also apply a transform to the prediction error using transform coding (e.g., using a form of a discrete cosine transform (DCT), a form of a discrete sine transform (DST), or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

In some cases, one or more adaptive loop filters (ALFs) can be applied individually to color components in video data to improve the quality of output video. For instance, an ALF can be applied to a picture or a block of a picture after the picture or block has been reconstructed using inter-prediction or intra-prediction. In some cases, ALF filtering can be used to correct or fix artifacts introduced during reconstruction of the picture or block.

In some video formats, certain color components include additional data as compared to other color components. For example, video data having a 4:2:0 format includes luma data having a higher resolution than the associated chroma data. In such video formats, ALF filtering may only be applied to the higher resolution luma data. In other formats, however, such as red-green-blue (RGB) data and 4:4:4 format data (where all color components have the same sampling rate), the different color components have similar characteristics. Some video coding Standards (e.g., the EVC standard) are structured so that ALF filtering is applied to luma components and non-luma components (e.g., chroma components) do not receive ALF filtering. In such cases, the output performance can be improved by applying ALF to more than one color component (e.g., applying ALF filtering to one or more chroma components in addition to being able to apply ALF filtering to the luma component). Aspects described herein provide additional flexibility and efficient signaling for formats where ALF filtering of multiple color components results in improvements in output images.

For instance, aspects described herein can include applying ALF filtering to multiple color components of a video bitstream to improve performance. In one example, an RGB format video bitstream can include pictures divided into slices including multiple CTBs. Each slice can include separate CTBs for red color components, green color components, and blue color components. In another example, a video bitstream including luma and chroma components (e.g., in a luma (Y)-chroma blue (Cb)-chroma red (Cr) format, referred to as a YCbCr format) can include pictures divided into slices. Each slice can include CTBs for the luma components and CTBs for two chroma components (e.g., CTBs for the Cb components and CTBs for the Cr components). While some video coding Standards emphasize ALF filtering of a single color component (e.g., luma CTBs), examples described herein provide slice header based signaling to flexibly allow ALF filtering of additional color components of video data (e.g., ALF filtering of either or both chroma CTBs in addition to luma CTBs).

In some examples, an ALF chroma filter signal flag is added to ALF data (e.g., in an alf_data syntax structure) in a video bitstream (e.g., in a parameter set, in header data such as a slice header, etc.). In one illustrative example, the ALF chroma filter signal flag can include an alf_chroma_filter_signal_flag syntax element in the alf_data syntax structure. The ALF chroma filter signal flag, operating with an ALF luma filter signal flag, can indicate that a chroma filter data is or is not signaled. In some cases, the ALF chroma filter signal flag can be used with a slice ALF chroma identifier (e.g., signaled as a slice_alf_chroma_idc syntax element) that is signaled in a slice header rather than in the ALF data (e.g., rather than in the alf_data syntax structure) to indicate ALF filtering of additional color components (e.g., non-luma components, such as chroma components). For instance, the ALF chroma filter signal flag (e.g. alf_chroma_filter_signal_flag syntax element in the alf_data syntax structure) can indicate that ALF is available for one or more chroma components, and the slice ALF chroma identifier (e.g., slice_alf_chroma_idc in the slice header) can have values (e.g., values from 0 to 3) that each indicate different ALF chroma options. In one example, a first value can indicate that ALF filtering is to be applied to a first chroma component, a second value can indicate that ALF filtering is to be applied to a second chroma component, a third value can indicate that ALF filtering is to be applied to both the first and second chroma components, and a fourth value can indicate that ALF filtering is not to be applied to either the first or second chroma components.

The techniques described herein can be applied to any of the existing video codecs (e.g., High Efficiency Video Coding (HEVC), Advanced Video Coding (AVC), or other suitable existing video codec), MPEG5 Efficient Video Coding (EVC) (e.g., implemented in ETM5. 0), Versatile Video Coding (VVC), the joint exploration model (JEM), VP9, AV1, and/or can be an efficient coding tool for any video coding standards being developed and/or future video coding standards.

FIG. 1A is a block diagram illustrating an example of a system 100 including an encoding device 104 and a decoding device 112. The encoding device 104 may be part of a source device, and the decoding device 112 may be part of a receiving device (also referred to as a client device). The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, a server device in a server system including one or more server devices (e.g., a video streaming server system, or other suitable server system), a head-mounted display (HMD), a heads-up display (HUD), smart glasses (e.g., virtual reality (VR) glasses, augmented reality (AR) glasses, or other smart glasses), or any other suitable electronic device.

The components of the system 100 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 100 is shown to include certain components, one of ordinary skill will appreciate that the system 100 can include more or fewer components than those shown in FIG. 1A. For example, the system 100 can also include, in some instances, one or more memory devices other than the storage 108 and the storage 118 (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 1A.

The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H. 261, ISO/IEC MPEG-1 Visual, ITU-T H. 262 or ISO/IEC MPEG-2 Visual, ITU-T H. 263, ISO/IEC MPEG-4 Visual, ITU-T H. 264 (also known as ISO/IEC MPEG-4 AVC), including its Scalable Video Coding (SVC) and Multiview Video Coding (MVC) extensions, and High Efficiency Video Coding (HEVC) or ITU-T H. 265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore and develop new video coding tools for the next generation of video coding standard, named Versatile Video Coding (VVC). The reference software is called VVC Test Model (VTM). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9 and Alliance of Open Media (AOMedia) Video 1 (AV1) are other video coding standards for which the techniques described herein can be applied.

Many embodiments described herein can be performed using video codecs such as MPEG5 EVC, VVC, HEVC, AVC, and/or extensions thereof. However, the techniques and systems described herein may also be applicable to other video coding Standards, such as MPEG4 or other MPEG standard, Joint Photographic Experts Group (JPEG) (or other coding standard for still images), VP9, AV1, extensions thereof, or other suitable coding Standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1A, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures. Pictures may also be referred to as "frames." A picture or frame is a still image that, in some cases, is part of a video. In some examples, data from the video source 102 can be a still image that is not a part of a video. In some video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. In other instances, a picture may be monochrome and may only include an array of luma samples. A pixel can refer to a point in a picture that includes luma and chroma samples. For example, a given pixel can include a luma sample from the $S_L$ array, a Cb chrominance sample value from the $S_{Cb}$ array, and a Cr chrominance sample value from the $S_{Cr}$ array.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a Random Access Skipped Leading (RASL) picture flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, in some video standards, a video bitstream may include one or more CVSs including NAL units. Each of the NAL units has a NAL unit header. In one example, the header is one-byte for H. 264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the some video standards, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. In some cases, the encoder engine 106 can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

Figure 1B:
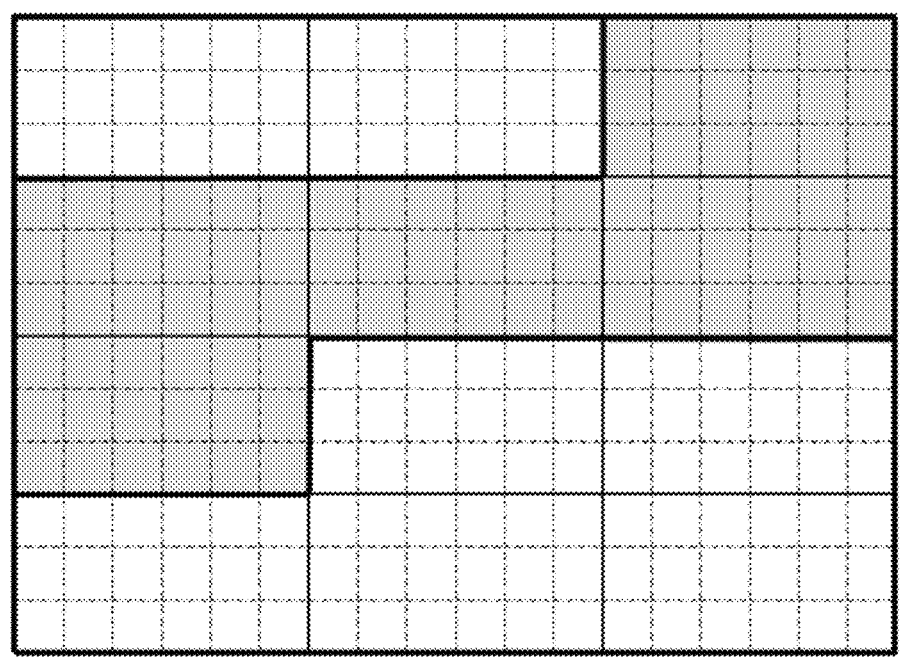
FIG. 1B is a diagram illustrating an example implementation of a picture divided into tiles and slices, in accordance with the techniques of this disclosure.

In some examples, the encoder engine 106 can partition each picture into subpictures, slices, and tiles, such as described in the VVC Standard. FIG. 1B is a diagram from the VVC Standard illustrating an example of a picture 121 divided slices and tiles. As shown, the picture 121 is divided into one or more tile rows and one or more tile columns. A tile can be defined as a sequence of CTUs that covers a rectangular region of a picture. In some cases, the CTUs in a tile are scanned in raster scan order within that tile. A slice can include an integer number of complete tiles or an integer number of consecutive complete CTU rows within a tile of a picture. For instance, each vertical slice boundary can also be a vertical tile boundary. As noted below, each CTU can include a number of coding tree blocks (CTBs). A subpicture can include one or more slices that collectively cover a rectangular region of a picture. For instance, each subpicture boundary can also be a slice boundary, and each vertical subpicture boundary can also be a vertical tile boundary. In some cases, all CTUs in a subpicture belong to the same tile. In some cases, all CTUs in a tile belong to the same subpicture.

In some video Standards, the slices are partitioned into CTBs of luma samples and chroma samples. A CTB of luma samples and one or more CTBs of chroma samples, along with syntax for the samples, are referred to as a coding tree unit (CTU). As described herein, video data can be structured as CTBs for different color components. ALF filtering of different color components can be applied to CTBs for each color component. A CTU may also be referred to as a "tree block" or a "largest coding unit" (LCU). A CTU is the basic processing unit for encoding in some standards. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to some video coding Standards, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to a given video coding standard (e.g., EVC). According to some video coding Standards, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of some standards. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per SOME STANDARDS, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There are a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in some standards.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $\Delta y_0$, refIdx$_0$ and $\Delta x_1$, $\Delta y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $\Delta y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., using inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform (DCT), discrete sine transform (DST), an integer transform, a wavelet transform, other suitable transform function, or any combination thereof. In some cases, one or more block transforms (e.g., a kernel of size 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). As previously noted, the residual data may correspond to pixel difference values between pixels of the unencoded picture and prediction values corresponding to the PUs. The encoder engine 106 may form one or more TUs including the residual data for a CU (which includes the PUs), and may transform the TUs to produce transform coefficients for the CU. The TUs may comprise coefficients in the transform domain following application of a block transform.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The video decoding device 112 may output the decoded video to a video destination device 119, which may include a display or other output device for displaying the decoded video data to a consumer of the content. In some aspects, the video destination device 119 may be part of the receiving device that includes the decoding device 112. In some aspects, the video destination device 119 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1A is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

As previously described, some video coding Standards define bitstreams that include a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

Various chroma formats can be used for video. A chroma format syntax element can be used to specify chroma sampling. For instance, a syntax element chroma_format_idc specifies the chroma sampling relative to the luma sampling, e.g. in the VVC and/or the EVC standard. In some cases, the value of chroma_format_idc shall be in the range of 0 to 2, inclusive.

Depending on the value of chroma_format_idc, the value of the variables SubWidthC and SubHeightC are assigned as specified in clause 6.2 of VVC and the variable ChromaArrayType is assigned. For example, the value of the variables SubWidthC and SubHeightC can be assigned as follows:

TABLE 2

SubWidthC and SubHeightC values derived from chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In some examples, the variable ChromaArrayType is assigned as follows:

If chroma_format_idc is equal to 0, ChromaArrayType is set equal to 0.

Otherwise, ChromaArrayType is set equal to chroma_format_idc.

The variables SubWidthC and SubHeightC are specified in Table 1 below, depending on the chroma format sampling structure, which is specified through chroma_format_idc. Other values of chroma_format_idc, SubWidthC and SubHeightC may be specified in the future by ISO/IEC.

TABLE 1

SubWidthC and SubHeightC values derived from chroma_format_idc

| chroma_format_idc | Chroma format | SubWidthC | SubHeightC |
|---|---|---|---|
| 0 | Monochrome | 1 | 1 |
| 1 | 4:2:0 | 2 | 2 |

TABLE 1-continued

SubWidthC and SubHeightC values derived from chroma_format_idc

| chroma_format_idc | Chroma format | SubWidthC | SubHeightC |
|---|---|---|---|
| 2 | 4:2:2 | 2 | 1 |
| 3 | 4:4:4 | 1 | 1 |

In monochrome sampling, there is only one sample array, which is nominally considered the luma array. In 4:2:0 sampling, each of the two chroma arrays (e.g., for Cb and Cr) has half the height and half the width of the luma array. In 4:2:2 sampling, each of the two chroma arrays has the same height and half the width of the luma array. In 4:4:4 sampling, each of the two chroma arrays has the same height and width as the luma array.

In the field of video coding, filtering can be applied in order to enhance the quality of a decoded or reconstructed video signal. In some cases, a filter can be applied as a post-filter, where a filtered frame is not used for prediction of future frames. In some cases, a filter can be applied as an in-loop filter, where a filtered frame is used to predict one or more future frames. For example, an in-loop filter can filter a picture after reconstruction (e.g., after addition of the residual to the prediction) is performed for the picture and before the picture is output and/or before the picture is stored in a picture buffer (e.g., a decoded picture buffer). A filter can be designed, for example, by minimizing the error between the original signal and the decoded filtered signal. Examples of filters include deblocking filters, adaptive loop filters (ALFs), and sample adaptive offset (SAO) filters.

Figure 1C:
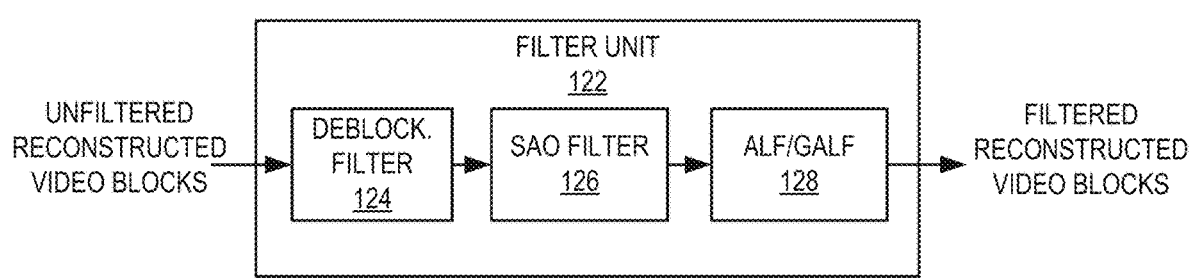
FIG. 1C is a diagram illustrating an example implementation of a filter unit for performing color component based ALF, in accordance with the techniques of this disclosure.

FIG. 1C shows an example implementation of a filter unit 122 that can be used for processing video pictures or blocks using ALF filtering in accordance with examples herein. In some cases, the filter unit 122 can be implemented as the filter unit 63 of FIG. 7 and/or the filter unit 91 of FIG. 8. For example, the filter units 63 and 91 may perform the techniques of this disclosure, in some cases in conjunction with other components of video encoding device 104 or video decoding device 112. In some examples, the filter units 63 and 91 can be a post-processing unit that can perform the techniques of this disclosure outside of, for example, the video encoding device 104 and the video decoding device 112 (e.g., after the decoded video is output from the video decoding device 112).

In the example of FIG. 1C, filter unit 122 includes a deblocking filter 124, a sample adaptive offset (SAO) filter 126, and an adaptive loop filter (ALF)/geometry transformation-based adaptive loop filter (GALF) filter 128. The SAO filter 126 may, for example, be configured to determine offset values for samples of a block. The deblocking filter 124 can be used to compensate for the use of block structural units in the coding process. The ALF filter 128 can be used to minimize the error (e.g., the mean square error) between original samples and decoded samples by using an adaptive filter, which can be a Wiener-based adaptive filter or other suitable adaptive filter. The ALF filter 128 may be configured to, for example, determine parameters for filtering a current block based on signaled parameters for filtering color components of the current block. As described further herein, the signaled parameters can be based on a sampling format, which can improve device performance by providing ALF filtering for multiple color components in some video signals (e.g., RGB or 4:4:4 format luma-chroma-chroma format video data).

In some examples, following the deblocking filter 124, the ALF 128 (e.g., with a block-based filter adaption) can be applied. In some cases, for a luma component of a block, one among 25 filters can be selected through a classification process for each block (e.g., for each 4×4 block or other sized block) based on local statistics estimates, such as gradient and directionality. To benefit from symmetrical properties of filters, a utilized ALF can employ a filter coefficient transformation process. More details on the ALF design is provided below. Loop filters in general are further described below with respect to FIG. 7 and FIG. 8.

The filter unit 122 may include fewer filters and/or may include additional filters and/or other components than those shown in FIG. 1C. Additionally, the particular filters shown in FIG. 1C may be implemented in a different order. Other loop filters (either in the coding loop or after the coding loop) may also be used to smooth pixel transitions or otherwise improve the video quality. When in the coding loop, the decoded video blocks in a given frame or picture can be stored in a decoded picture buffer (DPB). A DPB stores reference pictures used for subsequent motion compensation (e.g., for inter-prediction). The DPB may be part of or separate from additional memory that stores decoded video for later presentation on a display device, such as a display of video destination device 119 of FIG. 1A.

As described above, different sample formats for color components can result in different performance results when filtering is applied. Some video coding Standards emphasize ALF filtering of luma components (in which case ALF filtering is not applied to non-luma components, such as chroma components), such as due to a prevalence of video data having the 4:2:0 format. Other formats, however, such as 4:4:4 format data RGB data, etc., can benefit from improved image quality when ALF filtering is applied to more than one color component (e.g., two or three color components in RGB formats or luma-chroma formats such as YUV and YCbCr formats).

Figure 2A:
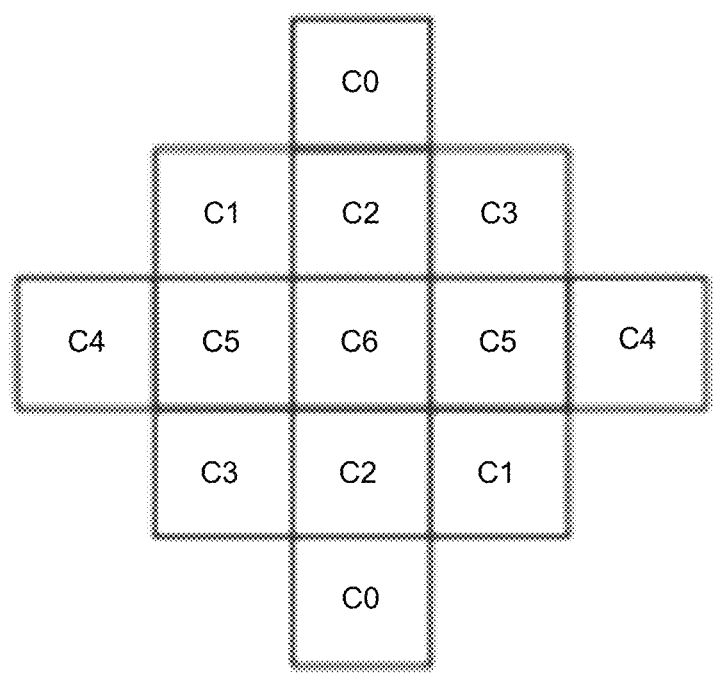
FIG. 2A is a conceptual diagram illustrating an example of adaptive loop filter (ALF) filter support including a 5×5 diamond, in accordance with some examples.
Figure 2B:
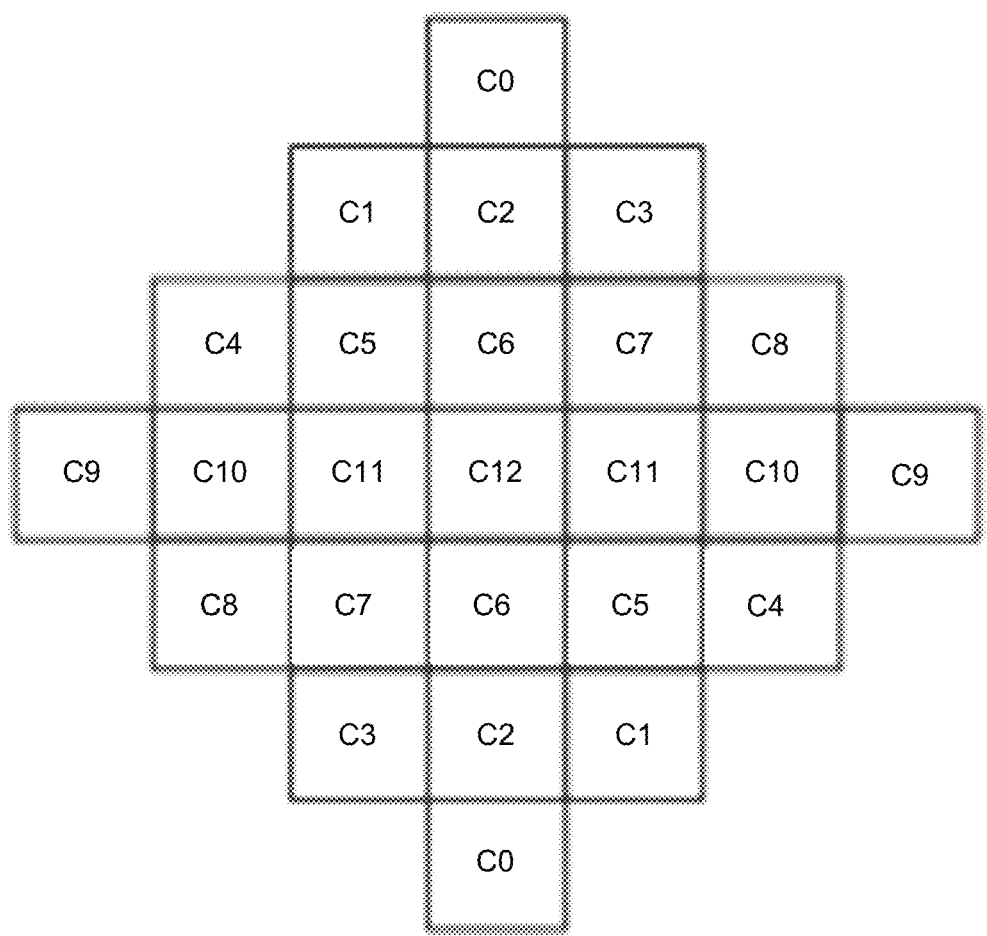
FIG. 2B is a conceptual diagram illustrating another example of ALF filter support including a 7×7 diamond, in accordance with some examples.

Various filter shapes can be used. Two diamond filter shapes (as shown in FIG. 2A and FIG. 2B) are used in some implementations. In some examples, the 5×5 diamond in FIG. 2A and the 7×7 diamond in FIG. 2B can be used to filter luma samples, and the 5×5 diamond shape in FIG. 2A can be used for chroma samples.

In some cases, block classification can be performed. For instance, for a luma component of a pixel (a luma sample), each 4×4 block can be categorized into one out of 25 classes. The classification index C is derived based on its directionality D and a quantized value of activity Â, as follows:

$$C = 5D + \hat{A}$$

In some examples, to calculate D and Â, gradients of the horizontal, vertical, and two diagonal direction are first calculated using 1-D Laplacian:

$$g_v = \sum_{k=i-2}^{i+3} \sum_{l=j-2}^{j+3} V_{k,l}, \; V_{k,l} = |2R(k,l) - R(k, l-1) - R(k, l+1)|$$

$$g_h = \sum_{k=i-2}^{i+3} \sum_{l=j-2}^{j+3} H_{k,l}, \; H_{k,l} = |2R(k,l) - R(k-1, l) - R(k+1, l)|$$

$$g_{d1} = \sum_{k=i-2}^{i+3} \sum_{l=j-3}^{j+3} D1_{k,l}, \; D1_{k,l} = |2R(k,l) - R(k-1, l-1) - R(k+1, l+1)|$$

$$g_{d2} = \sum_{k=i-2}^{i+3} \sum_{j=j-2}^{j+3} D2_{k,l}, \; D2_{k,l} = |2R(k,l) - R(k-1, l+1) - R(k+1, l-1)|$$

Where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIG. 3A, FIG. 3B, FIG. 3C, and FIG. 3D, which illustrates subsampled Laplacian calculation, the same subsampled positions are used for gradient calculation of all directions, including the vertical gradient (in FIG. 3A), the horizontal gradient (in FIG. 3B), and the diagonal gradients (in FIG. 3C and FIG. 3D).

D maximum and minimum values of the gradients of horizontal and vertical directions are set as:

$$g_{h,v}^{max}=\max(g_h,g_v), g_{h,v}^{min}=\min(g_h,g_v)$$

The maximum and minimum values of the gradient of two diagonal directions are set as:

$$g_{d0,d1}^{max}=\max(g_{d0},g_{d1}), g_{d0,d1}^{min}=\min(g_{d0},g_{d1})$$

To derive the value of the directionality D, these values are compared against each other and with two thresholds $t_1$ and $t_2$:

Step 1. If both $g_{h,v}^{max} \le t_1 \cdot g_{h,v}^{min}$ and $g_{d0,d1}^{max} \le t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$ continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l})$$

where value A is further quantized to the range of 0 to 4, inclusively, and the quantized value is denoted as Â.

For chroma components in a picture, no classification method is applied (e.g., a single set of ALF coefficients is applied for each chroma component).

Geometric transformations of filter coefficients can be applied in some cases. For instance, in some examples, before filtering each 4×4 luma block, geometric transformations such as rotation or diagonal and vertical flipping are applied to the filter coefficients f(k,l) depending on gradient values calculated for that block. In some cases, this is equivalent to applying these transformations to the samples in the filter support region. The transformations can make different blocks to which ALF is applied more similar by aligning their directionality.

Three geometric transformations, including diagonal, vertical flip and rotation can be introduced:

diagonal: $f_D(k,l)=f(l,k)$, vertical flip: $f_V(k,l)=f(k,K-l-1)$, rotation: $f_R(k,l)=f(-l-1,k)$, where K is the size of the filter and $0 \le k, l \le K-1$ are coefficients coordinates, such that location (0,0) is at the upper left corner and location (K-1, K-1) is at the lower right corner. The transformations are applied to the filter coefficients f (k, l) depending on gradient values calculated for that block. The relationship between the transformation and the four gradients of the four directions are summarized in the following table.

TABLE 4

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

In some aspects, adaptive parameter sets (APSs) can be used to signal filter parameters or filter data (e.g., filter coefficients and/or other parameters) in the bitstream, such as in an APS NAL unit. An APS can have an associated type, such as an ALF type or an luma mapping with chroma scaling (LMCS) type (e.g., as defined in the VVC Standard or other video coding Standard). An APS can include a set of luma filter parameters, one or more sets of chroma filter parameters, or a combination thereof. APSs can be used in various video coding Standards, such as VVC, EVC, etc. In some cases, signaling of APSs may be limited. For instance, a tile group (e.g., a group of one or more tiles, such as those shown in FIG. 1B) may only signal indices of APSs (e.g., in a tile group header) that are used for the tile group.

In some examples, each APS can be identified by a unique identifier (e.g., adaptation_parameter_set_id) which is used for referencing the current APS information from other syntax elements. APSs can be shared across pictures and can be different for different portions of a picture (e.g., for different tile groups within a picture). When a tile_group_alf_enabled_flag is equal to 1, an APS is referenced by a tile group header, and the ALF parameters carried in the APS can be carried out-of-band (e.g., provided by external means other than the video encoding device), providing a benefit in some circumstances.

As described herein, aspects are described that can use APSs for indicating (e.g., using one or more flags or other syntax) whether ALF filtering is available for certain color components (e.g., chroma components) in addition to existing signaling (e.g., flags) that indicates ALF filtering for other color components (e.g., luma components). Additional signaling can be implemented using slice headers to increase flexibility and available output quality associated with ALF filtering of the additional color components (e.g., ALF filtering for chroma in addition to luma components).

For instance, examples are described herein where filter applicability can be controlled at the block level (e.g., the CTB level). In some examples, a first flag is signalled to indicate whether ALF is applied to a luma components of a block (e.g., a luma CTB), and a second flag is signalled to indicate whether ALF is available to chroma components of the block (e.g., one or more chroma CTBs, such as a Cb CTB and/or a Cr CTB). Such flags can, for example, be signaled in ALF data (e.g., an alf_data syntax structure, as described below). In some aspects, for chroma CTB signaling, a flag can be signalled to indicate whether ALF is available to be applied using an alf_chroma_ctb_present_flag syntax element, as detailed below.

At the decoder side, when ALF is enabled for a block (e.g., a CTB), each sample R(i,j) within the block (e.g., with the CTB or within a coding block of the CTB, such as a CU) is filtered, resulting in sample value R'(i,j) as shown below, where L denotes filter length, $f_{m,n}$ represents filter coefficient, and f(k,l) denotes the decoded filter coefficients.

$$R'(i, j) = \left( \sum_{k=-\frac{L}{2}}^{\frac{L}{2}} \sum_{l=-\frac{L}{2}}^{\frac{L}{2}} f(k, l) \times R(i+k, j+l) + 64 \right) \gg 7$$

Fixed filters can be used in some cases. For example, some ALF designs are initialized with a set of fixed filters provided to decoder as a side information. In some cases, there are 64 7×7 filters in total (e.g., with each filter containing 13 coefficients). For each class of classification, a mapping is applied to define which 16 fixed filters from the 64 filters can be used for the current class. The choice index (0-15) of each class is signaled as a fixed filter index. When an adaptively derived filter is used, the difference between fixed filter coefficients and adaptive filter coefficients is signalled.

In some cases, temporal filters can be used. For example, to further benefit from temporal correlation of video data, the ALF design can utilize reusage of the ALF coefficients signalled earlier in APS NAL units. Each APS is identified by the unique adaptation_parameter_set_id which is used for referencing the current APS information from other syntax elements (e.g., from the tiles group header). In some cases, all signalled APSs with unique set identifier values are stored in an APS buffer (e.g., with a size up to 32 (entries). To enable a random access (RA) coding configuration, an encoder's choice of the APS adaptation_parameter_set_id usage is constrained. For example, to maintain temporal scalability, only temporal filters from the same or lower temporal layers can be used.

An example of an adaptive loop filter data syntax is as follows:

| alf_data( ) { | Descriptor |
|---|---|
| alf_luma_filter_signal_flag | u(1) |
| alf_chroma_idc | tu(v) |
| if(alf_luma_filter_signal_flag ) { | |
| alf_luma_num_filters_signalled_minus1 | tb(v) |
| alf_luma_type_flag | u(1) |
| if(alf_luma_num_filters_signalled_minus1 > 0) { | |
| for(i = 0; i < NumAlfFilters; i+ +) | |
| alf_luma_coeff_delta_idx[i] | tb(v) |
| } | |
| alf_luma_fixed_filter_usage_pattern | uek(v) |
| if(alf_luma_fixed_filter_usage_pattern = =2) { | |
| for(i = 0; i < NumAlfFilters; i+ +) | |
| alf_luma_fixed_filter_usage_flag[i] | u(1) |
| } | |
| if(alf_luma_fixed_filter_usage_pattern > 0) { | |
| for(i = 0; i < NumAlfFilters; i+ +) { | |
| if(alf_luma_fixed_filter_usage_flag[i]) | |
| alf_luma_fixed_filter_set_idx[i] | tb(v) |
| } | |
| } | |
| alf_luma_coeff_delta_flag | u(1) |
| if(!alf_luma_coeff_delta_flag && alf_luma_num_filters_signalled_minus1 > 0) | |
| alf_luma_coeff_delta_prediction_flag | u(1) |
| alf_luma_min_eg_order_minus1 | ue(v) |
| for(i = 0; i < max_golomb_idx; i+ +) | |
| alf_luma_eg_order_increase_flag[i] | u(1) |
| if(alf_luma_coeff_delta_flag) { | |
| for(i = 0; i < NumAlfFilters; i+ +) | |
| alf_luma_coeff_flag[i] | u(1) |
| } | |

-continued

| alf_data( ) { | Descriptor |
|---|---|
| for(i = 0; i < NumAlfFilters; i+ +) { | |
| if(alf_luma_coeff_flag[i]) { | |
| for(j = 0; j < NumAlfCoefs − 1 ; j+ +) { | |
| alf_luma_coeff_delta_abs[i][j] | uek(v) |
| if(alf_luma_coeff_delta_abs[i][j]) | |
| alf_luma_coeff_delta_sign_flag[i][j] | u(1) |
| } | |
| } | |
| } | |
| } | |
| if(alf_chroma_idc > 0) { | |
| alf_chroma_min_eg_order_minus1 | ue(v) |
| for(i = 0; i < max_golomb_idx; i+ +) | |
| alf_chroma_eg_order_increase_flag[i] | u(1) |
| for(j = 0; j < 6; j+ +) { | |
| alf_chroma_coeff_abs[j] | uek(v) |
| if(alf_chroma_coeff_abs[j] > 0) | |
| alf_chroma_coeff_sign_flag[j] | u(1) |
| } | |
| } | |
| } | |

As described above, ALF filtering in some video coding Standards (e.g., MPEG5 EVC) includes filtering luma components with an APS filter bank and a classifier. The adaptive filter bank and classifier can indicate filtering selected from pre-stored or signaled filters in the APS filter bank. In some such examples, a chroma component can be filtered with a single 5×5 filter with coefficient(s) being signaled once per APS.

As further described above, such coding operations may become inefficient for coding of RGB format video, 4:4:4 chroma format video, or video having other formats where color components (e.g., luma and chromi components) have similar characteristics. For example, in the 4:4:4 chroma format, all three color components are present at full resolution. With this shared full resolution of all three color components, the two non-luma components (e.g., the chroma components) may benefit from more advanced filtering (e.g., with luma type ALF applied to all three components). As described herein, luma type ALF filtering can refer to ALF filtering for higher resolution or more complex data (e.g., when compared with the above described smaller filter with coefficients signaled once per APS). Examples described herein can signal ALF filter data at the slice header level when chroma ALF flags are set to allow luma type ALF filtering for chroma components, which can enable more flexible ALF filtering of chroma data.

Another problem that existed in ALF filtering designs is that some video coding Standards utilize an alf_chroma_idc syntax element, which is signaled in an APS. The alf_chroma_idc syntax element is utilized to control filtering (whether filtering is on or off for certain video data) over certain chroma component data. In some such Standards, an alf_chroma_idc equal to 0 specifies that the chroma adaptive loop filter set is not signalled and is not to be applied to Cb and Cr color components, an alf_chroma_idc larger than 0 indicates that a chroma ALF set is signaled, an alf_chroma_idc equal to 1 indicates that the chroma ALF set is applied to the Cb color component, an alf_chroma_idc equal to 2 indicates that the chroma ALF set is applied to the Cr color component, and an alf_chroma_idc equal to 3 indicates that the chroma ALF set is applied to Cb and Cr color components. When such a signal is indicated in the APS without an option to change the setting for later slices subject to shared APS signaling, there is no option to adjust the ALF filtering where needed to target changes that occur at the slice level. Such APS signaling thus reduces performance by preventing the use of appropriate chroma ALF filtering.

Systems, methods, and computer-readable media are described for improving of filtering (e.g., adaptive loop filter (ALF), deblocking, and/or other filtering) and enabling coding of video data with different color formats (e.g., a 4:4:4 color format, a 4:2:0 color format, and/or other color formats). Examples described herein improve on existing techniques (e.g., video coding Standard-based techniques) by enabling additional flexibility in ALF filtering of additional color components (e.g., chroma components) to improve coding efficiency and/or output performance for some video coding devices and networks. Such improvements can be applied to any video coding Standard, such as those that emphasize luma ALF filtering as described above. As one possible implementation, the following changes to the MPEG5 EVC are proposed, and examples are described below in the context of the EVC standard. It will be apparent that similar implementations can be used with other standards having the characteristics described above.

As part of the improved flexibility described above, in some aspects signaling of a chroma filter is controlled by a separate flag signaled in an APS. As shown below, a slice ALF chroma identifier (e.g., a slice_alf_chroma_idc syntax element) is moved from ALF data (e.g., an alf_data syntax structure) to a slice header (e.g., a slice_header( ) syntax structure) to allow more flexible signaling and more frequent changing of the settings from the slice ALF chroma identifier described below to match the available chroma ALF filtering to the video data format (e.g., to a 4:4:4 format, etc.). Example language is described below, with portions modified to indicate aspects as described herein. Changes relative to the EVC standard in accordance with some aspects described herein are shown marked in underlined text to indicate new language and a strikethrough to indicate old removed language between "<highlight>" and "<highlightend>" symbols (e.g., "<highlight>highlighted text<highlightend>" and "<highlightremovedhighlightedtext <highlightend>").

| alf_data( ) { | Descriptor |
|---|---|
| alf_luma_filter_signal_flag | u(1) |
| <highlight> slice_alf_chroma_idc | u(2) |
| alf_chroma_filter_signal_flag | u(1) |
| <highlightend> | |
| if( alf_luma_filter_signal_flag) { | |

<highlight>alf_chroma_filter_signal_flag equal to 1 specifies that chroma filter data is signalled. alf_chroma_filter_signal_flag equal to 0 specifies that chroma filter is not signalled. When alf_chroma_filter_signal_flag is not present, it is inferred to be equal to 0.<highlightend>

| slice_header( ) { | Descriptor |
|---|---|
| slice_pic_parameter_set_id | ue(v) |
| ... | |
| if(sps_alf_flag) { | |
| slice_alf_enabled_flag | u(1) |
| <highlight>slice_alf_chroma_idc | u(2) |
| <highlightend>if(slice_alf_enabled_flag) { | |
| slice_alf_luma_aps_id | u(5) |
| slice_alf_chroma_aps_id | u(5) |
| slice_alf_map_signalled | u(1) |
| } | |
| } | |

<highlight>slice_alf_chroma_idc equal to 0 specifies that the ALF is not applied to Cb and Cr colour components in a slice. slice_alf_chroma_idc larger than 0 indicates that ALF can be applied for filtering either Cb or Cr color components in current slice. When ChromaArrayType is in the range from 1 to 2, inclusive, slice_alf_chroma_idc equal to 1 indicates that the adaptive loop filter can be applied to the Cb colour component, slice_alf_chroma_idc equal to 2 indicates that the adaptive loop filter can be applied to the Cr colour component, and slice_alf_chroma_idc equal to 3 indicates that the adaptive loop filter is applied to Cb and Cr colour components. When alf_chroma_idc is not present, it is inferred to be equal to 0.<highlightend>

As shown above for the ALF data (the alf_data syntax structure) and the slice_header syntax structure, aspects described herein can use ALF data to signal both a flag for luma ALF and a flag for chroma ALF. As indicated by the syntax above, the alf_chroma_filter_signal_flag syntax element specifies whether chroma filter data is signaled in the bitstream (e.g., in an APS). The filter data can include filter coefficients in some cases. The slice_alf_chroma_idc syntax element in the slice header data (e.g., the slice_header( ) syntax element) of a bitstream specifies whether an ALF is applied to one or more chroma components (e.g., Cb and/or Cr color components) in a slice. In some examples, if an ALF chroma filter signal flag value (e.g., a value of the alf_chroma_filter_signal_flag syntax element) does not include an explicit value in the bitstream, the value can be inferred as a zero. In such examples, a decoder can determine an ALF chroma filter signal flag value to be zero from the ALF data even when the explicit flag value is not signaled in a bitstream. The associated slice ALF chroma identifier (e.g., the slice_alf_chroma_idc syntax element) can indicate when ALF is applied to chroma data, such as after the ALF chroma filter signal flag value (e.g., a value of the alf_chroma_filter_signal_flag syntax element) is used to identify that chroma ALF is signaled in the bitstream. In the described implementation, a non-zero value of slice_alf_chroma_idc (e.g., an ALF chroma indication from the slice header) indicates that ALF can be applied to a chroma component of video data. A specific non-zero value (e.g., 1, 2, 3, etc.) can be used to map which specific color components can have ALF applied.

For example, the ChromaArrayType variable describes the format of the video signal (e.g., whether the signal has chroma at all, such as monochrome format or a format with one or more chroma components). The slice_alf_chroma_idc syntax element specifies application of the ALF to chroma components. The slice_alf_chroma_idc=0 specifies that NO ALF is applied to the chroma component. slice_alf_chroma_idc=0 can be signaled even from ChromaArrayType=2 (indicating that there are chroma components in the video signal). However, if chromaArrayType=0 (indicating that the video signal is luma only), slice_alf_chroma_idc cannot be signalled as having a value larger than 0, which would indicate that chroma filtering will be conducted.

Figure 4:
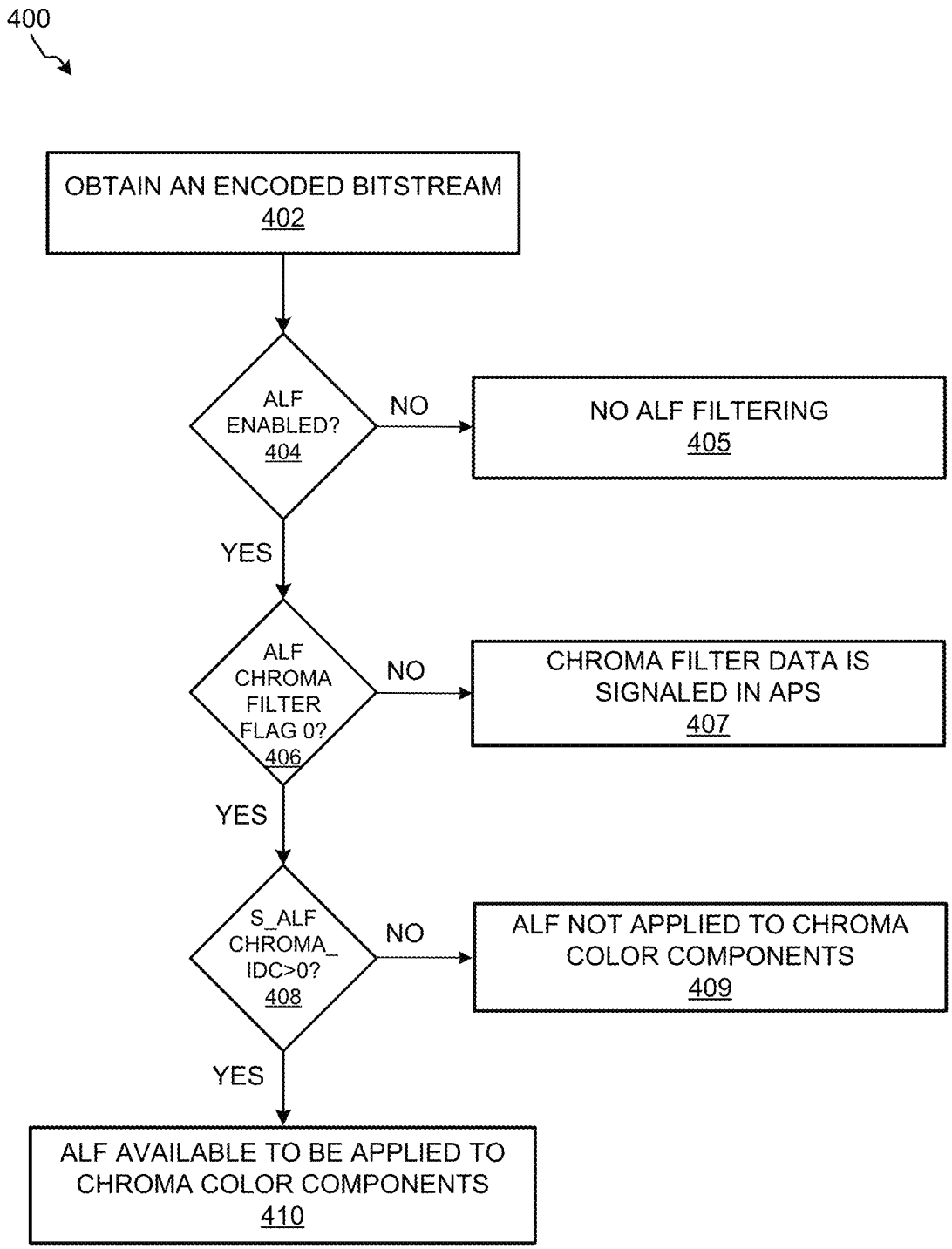
FIG. 4 is a flow diagram illustrating aspects of ALF support for differing color formats, in accordance with some examples.

FIG. 4 illustrates aspects of a process 400 providing ALF support for differing color formats for a decoding device (e.g., the decoding device 112), in accordance with some examples. As shown in FIG. 4, operation 402 of the process 400 involves the decoding device obtaining an encoded bitstream (referred to also as a bitstream or a video bitstream). The encoded bitstream can include both ALF data (e.g., the alf_data( ) syntax structure above) and slice header data (e.g., the slice_header( ) syntax structure above) for encoded video data of the encoded bitstream. As part of processing the encoded video data, in operation 404, the decoding device determines if ALF is enabled for the encoded bitstream. If ALF is not enabled (e.g., not available for processing either luma or chroma color components), the decoding proceeds with no ALF filtering in operation 405 until the settings change to enable ALF for a portion of the encoded video data (e.g., for one or more slices of the video data).

If ALF is available, an ALF luma filter signal flag (e.g., the alf_luma_filter_signal_flag syntax element from the alf_data( ) syntax structure above) and an ALF chroma filter signal flag (e.g., the alf_chroma_filter_signal_flag syntax element from the alf_data( ) syntax structure above) can be included (e.g., added by the encoding device 104) in the ALF data as part of the encoded bitstream. As described herein, values for such flags can be inferred in some cases. For example, in one implementation, values of 1 can be signaled for the ALF luma filter signal flag and/or the ALF chroma filter signal flag explicitly, and values of 0 can be inferred when no value is present in the bitstream. At operation 406, the decoding device can process the ALF data to determine if an ALF chroma filter signal flag has a value of 0. If the value of the ALF chroma filter signal flag is not 0 (e.g., the value of the flag is 1 or other value not equal to 1), the decoding device can determine, at operation 407, that the chroma filter data is signaled in an APS (e.g., instead of indicated in slice header data).

In the implementation of FIG. 4, if the ALF chroma filter flag is determined to be 0, the decoding device can determine at operation 408 whether ALF is available to be applied to any chroma components by determining whether a value of a slice ALF chroma indication (e.g., slice_alf_chroma_idc or ChromaArrayType) is a non-zero value (e.g., a value of 1 or other value not equal to 1). If the value of the slice ALF chroma indication (e.g., slice_alf_chroma_idc or ChromaArrayType) is determined not to be a non-zero value (e.g., is determined to be a value of 0), the decoding device can determine at operation 409 that ALF is not to be applied to chroma color components of a current slice of video data (e.g., associated with the slice data including the slice ALF chroma identifier). Based on the determination, the decoding device can not apply the ALF to the chroma color components of the current slice. If the slice ALF chroma identifier is determined by the decoding device to be a non-zero value (e.g., a value of 1 or other value), the decoding device can determine at operation 410 that ALF is available to be applied (or can be applied) to one or more chroma color components (e.g., a Cb component and/or a Cr component) of the slice of video data or a portion thereof (e.g., a block of the slice, such as a CTU, CU, CTB, CB, etc.). The decoding device can then proceed to apply the ALF to one or more of the chroma components based on a particular value of the slice ALF chroma identifier, as discussed further below.

In some examples, ALF parameters signaling and applicability are made to be dependent on a chroma format identifier (id) that indicates a chroma format of video data, such as a 4:2:0 format, a 4:2:2 format, a 4:4:4 format, or other chroma format. In some cases, a chroma type array variable (e.g., ChromaArrayType) can be used as the chroma format id to indicate the chroma format of video data. In some examples, ALF filtering is enabled for two non-luma component (e.g., Cb and Cr components) of encoded video data, if the video is coded with ChromaArrayType equal to 3 (corresponding to a 4:4:4 format), or not equal to 4:2:0. In some examples, each chroma component can refer to a separate APS to access an optimal filter bank if the video data is coded using a chroma format other than the 4:2:0 format (e.g., using the 4:4:4 format or the 4:2:2 format). In some examples, an ALF classifier is to be executed over non-luma components to produce an index to a particular filter if the video data is coded using a format other than the 4:2:0 format. In some examples, for each chroma component, an independent block-based applicability map (e.g., where a block level flag is signaled) is coded for video data having a format other than the 4:2:0 format. In some examples, for video data having the 4:2:0 format and/or for video data having the 4:2:2 format, chroma filtering can be performed using a single filter without a classifier and no map is signaled, in which case every block may be conditionally filtered.

An example of syntax structures and semantics that can be used as part of operation 410 to determine how an available chroma ALF is to be applied is as follows (where changes relative to the EVC standard are shown marked in underlined text to indicate new language and a strikethrough to indicate old removed language between "<highlight>" and "<highlightend>" symbols):

```
if(sps_alf_flag) {
    slice_alf_enabled_flag                              u(1)
    slice_alf_chroma_idc                                u(2)
    if(slice_alf_enabled_flag) {
        slice_alf_luma_aps_id                           u(5)
        <highlight>if( (ChromaArrayType = = 1 ||
        ChromaArrayType = = 2) &&
                slice_alf_chroma_idc > 0) <highlightend>
            slice_alf_chroma_aps_id                     u(5)
            slice_alf_map_signalled                     u(1)
        }
        <highlight>if(ChromaArrayType = = 3 &&
        sliceChromaAlfEnabledFlag).
        {
            slice_alf_chroma_aps_id                     u(5)
            slice_alf_chroma_map_signalled              u(1)
        }
        if(ChromaArrayType = = 3 &&
        sliceChroma2AlfEnabledFlag) {
            slice_alf_chroma2_apps_id.                  u(5)
            slice_alf_chroma2_map_signalled             u(1)
        }<highlightend>
    }
```

<highlight>slice_alf_chroma_idc equal to 0 specifies that the ALF is not applied to Cb and Cr colour components in a slice. slice_alf_chroma_idc larger than 0 indicates that ALF can be applied for filtering either Cb or Cr color components in current slice. When ChromaArrayType is in the range from 1 to 2, inclusive, slice_alf_chroma_idc equal to 1 indicates that the adaptive loop filter can be applied to the Cb colour component, slice_alf_chroma_idc equal to 2 indicates that the adaptive loop filter can be applied to the Cr colour component, and slice_alf_chroma_idc equal to 3 indicates that the adaptive loop filter is applied to Cb and Cr colour components. When alf_chroma_idc is not present, it is inferred to be equal to 0.

When slice_alf_chroma_idc is equal to 1 or 3, the variables sliceChromaAlfEnabledFlag is set equal to 1, otherwise the variables sliceChromaAlfEnableFlag is set equal to 0.

When slice_alf_chroma_idc is equal to 2 or 3, the variables sliceChroma2AlfEnabledFlag is set equal to 1, otherwise the variables sliceChroma2AlfEnableFlag is set equal to 0.<highlightend>

| coding_tree_unit( ) { | Descriptor |
|---|---|
| if(slice_alf_enabled_flag && slice_alf_map_signalled) | |
|     alf_ctb_flag[xCtb >> CtbLog2SizeY] | ae(v) |
|     [yCtb >> CtbLog2SizeY] | |
| <highlight>if(sliceChromaAlfEnabledFlag && slice_alf_chroma_map_signalled) | |
|     alf_ctb_chroma_flag[xCtb >> CtbLog2SizeY] | ae(v) |
|     [yCtb >> CtbLog2SizeY] | |
| if(sliceChroma2AlfEnabledFlag && slice_alf_chroma2_map_signalled) | |
|     alf_ctb_chroma2_flag[xCtb >> CtbLog2SizeY] | ae(v) |
| [yCtb >> CtbLog2SizeY] | |
| <highlightend> | |
| } | | alf_ctb_flag[xCtb>>CtbLog2SizeY][yCtb>>CtbLog 2SizeY] equal to 1 specifies that the adaptive loop filter is applied to the coding tree block of the luma component of the coding tree unit at luma location (xCtb, yCtb). alf_ctb_flag[xCtb>>CtbLog2SizeY][yCtb>>CtbLog2SizeY] equal to 0 specifies that the adaptive loop filter is not applied to the coding tree block of the luma of the coding tree unit at luma location (xCtb, yCtb).
When alf_ctb_flag[xCtb>>CtbLog2SizeY][yCtb>>CtbLog 2SizeY] is not present, it is inferred to be equal to slice_alf_enabled_flag.
<highlight>alf_ctb_chroma_flag[xCtb>>CtbLog2SizeY] [yCtb>>CtbLog2SizeY] equal to 1 specifies that the adaptive loop filter is applied to the coding tree block of the first chroma component of the coding tree unit at luma location (xCtb,yCtb). alf_ctb_chroma_flag[xCtb>>CtbLog2SizeY] [yCtb>>CtbLog2SizeY] equal to 0 specifies that the adaptive loop filter is not applied to the coding tree block of the luma of the coding tree unit at luma location (xCtb, yCtb).
When alf_ctb_chroma_flag[xCtb>>CtbLog2SizeY][yCtb>>CtbLog2SizeY] is not present, it is inferred to be equal to sliceChromaAlfEnabledFlag.
alf_ctb_chroma2_flag[xCtb>>CtbLog2SizeY] [yCtb>>CtbLog2SizeY] equal to 1 specifies that the adaptive loop filter is applied to the coding tree block of the second chroma component of the coding tree unit at luma location (xCtb,yCtb). alf_ctb_chroma2_flag[xCtb>> CtbLog2SizeY][yCtb>>CtbLog2SizeY] equal to 0 specifies that the adaptive loop filter is not applied to the coding tree block of the luma of the coding tree unit at luma location (xCtb, yCtb).
When alf_ctb_chroma2_flagf[xCtb>>CtbLog2SizeY] [yCtb>>CtbLog2SizeY] is not present, it is inferred to be equal to sliceChroma2AlfEnabledFlag.<highlightend>
For every coding tree unit with luma coding tree block location (rx, ry), where rx=0 PicWidthInCtbsY−1 and ry=0. PicHeightInCtbsY−1, the following applies:
    When alf_ctb_flag[rx] [ry] is equal to 1, the coding tree block luma type filtering process as specified is invoked with recPicture$_L$, alfPicture$_L$, referenced APS identification slice_alf_luma_aps_id, and the luma coding tree block location (xCtb, yCtb) set equal to (rx<<CtbLog2SizeY, ry<<CtbLog2SizeY) as input, and the output is the modified filtered picture alfPicture$_L$.
    When ChromaArrayType is equal to 3, the coding tree block luma type filtering process for chroma samples of Cb and Cr chroma components are invoked as follows:
        When alf_ctb_flag[rx][ry] is equal to 1, the coding tree block luma type filtering process as specified is invoked with recPictureCb, alfPictureCb, referenced APS identification slice_alf_chroma_aps_id, and the chroma coding tree block location (xCtb, yCtb) set equal to (rx<<CtbLog2SizeY, ry<<CtbLog2SizeY) as input, and the output is the modified filtered picture alfPictureCb.
        When alf_ctb_chroma2_flag[rx][ry] is equal to 1, the coding tree block luma type filtering process as specified is invoked with recPictureCr, alfPictureCr, referenced APS identification slice_alf_chroma2_aps_id, and the chroma coding tree block location (xCtb, yCtb) set equal to (rx<<CtbLog2SizeY, ry<<CtbLog2SizeY) as input, and the output is the modified filtered picture alfPictureCr.
    Otherwise, when ChromaArrayType is in the range from 1 to 2, inclusive, and slice_alf_chroma_idc is larger than 0, the following applies:
        When sliceChromaAlfEnableFlag is equal to 1, the coding tree block chroma type filtering process as specified is invoked with recPicture set equal to recPictureCb, alfPicture set equal to alfPictureCb, referenced APS identification slice_alf_chroma_aps_id, and the chroma coding tree block location (xCtbC, yCtbC) set equal to ((rx<<CtbLog2 SizeY)/SubWidthC, (ry<<CtbLog2SizeY)/SubHeightC) as input, and the output is the modified filtered picture alfPictureCb.
        When sliceChroma2AlfEnableFlag is equal to 1, the coding tree block chroma type filtering process as specified is invoked with recPicture set equal to recPictureCr, alfPicture set equal to alfPictureCr, referenced APS identification slice_alf_chroma_aps_id, and the chroma coding tree block location (xCtbC, yCtbC) set equal to ((rx<< CtbLog2SizeY)/SubWidthC, (ry<<CtbLog2SizeY)/ SubHeightC) as input, and the output is the modified filtered picture alfPictureCr.

The above is an example of aspects implemented as a modification to EVC, but similar modifications can be made for aspects in other video coding Standards. The above syntax structure (e.g., the if(sps_alf_flag) syntax structure) can be part of a slice header syntax structure (e.g., the slice_header ( ) syntax structure) in an EVC encoded bitstream. Once a decoding device has determined that ALF is available generally (e.g., for luma and chroma components), and is available to be signaled at the slice level (e.g., instead of in an APS as described as part of operation 407), the above syntax structure can be processed by the decoding device to determine specific chroma components for which to apply an ALF.

For example, as shown in the above example slice header syntax, if slice_alf_enable_flag is true (e.g., a value of 1), the decoding device can check the ChromaArrayType variable for a value of 1 or 2 when slice_alf_chroma_idc (e.g., the ALF chroma indication from the slice header) is greater than 0. If this statement is true (e.g., ChromaArrayType is 1 or 2), an ALF application parameter set (APS) identifier is applied for a first color component (e.g., a luma component, a red component, a green component, a blue component, etc.) of the slice data. A slice_alf_map_signalled syntax element indicates the ALF filter values to be used in processing the first color component with ALF. The ChromaArrayType of 3 with a sliceChromaAlfEnabledFlag provides an ALF APS identifier for the second color component (e.g., a first chroma component, such as a Cb or Cr component, a red component, a green component, a blue component, etc.) of the slice of the video data. Similarly, a ChromaArrayType of 3 with a sliceChroma2AlfEnabledFlag provides an ALF APS identifier for a third color component (e.g., a second chroma component, such as a Cb or Cr component). The identifier (e.g., slice_alf_chroma_aps_id for the second component or slice_alf_chroma2_aps_id for the third color component, a red component, a green component, a blue component, etc.) is used with a signaled map (e.g., slice_alf_chroma_map_signalled) for the second color component or slice slice_alf_chroma2_map_signalled for the third color component to identify the ALF parameters to be used in filtering the corresponding data of the slice video data.

In some cases, there are multiple syntax elements controlling ALF application on chroma components of video data. For example, the slice_alf_chroma_aps_id syntax element noted above is a group flag specifying ALF application to chroma by number. For example, the slice_alf_chroma_aps_id syntax element can indicate for current slice that a first chroma component (e.g., Cb) is filtered, or that a second chroma component (e.g., Cr) is filtered, or that the first and second chroma components (e.g., Cb and Cr) are flittered, or that NONE of chroma components are filtered. For the slice_alf_chroma_aps_id syntax element, different chroma components can share the same identifier (ID), such as when the chroma format is 4:2:0 as one example. In the case of a 4:4:4 format, different color components may have different a different ID (e.g., aps id). The Alf_map syntax element (e.g., slice_alf_chroma_map_signalled) specifies that the ALF filter is ON or OFF for a given block (e.g., a luma CTB). The slice_alf_chroma_map_signalled syntax element specifies that additional syntax elements of the ALF ON/OFF map (e.g., the Alf map syntax element) is signaled for a first chroma component (e.g., Cb). In some cases, the slice_alf_chroma_map_signalled syntax element is signaled for non-4:0:0, 4:2:0 videos. The slice_alf_chroma2_map_signalled syntax element specifies that additional syntax elements of the ALF ON/OFF map is signaled for a second chroma component (e.g., Cr). In some cases, the slice_alf_chroma2_map_signalled syntax element is signaled for non-4:0:0, 4:2:0 videos.

Figure 5:
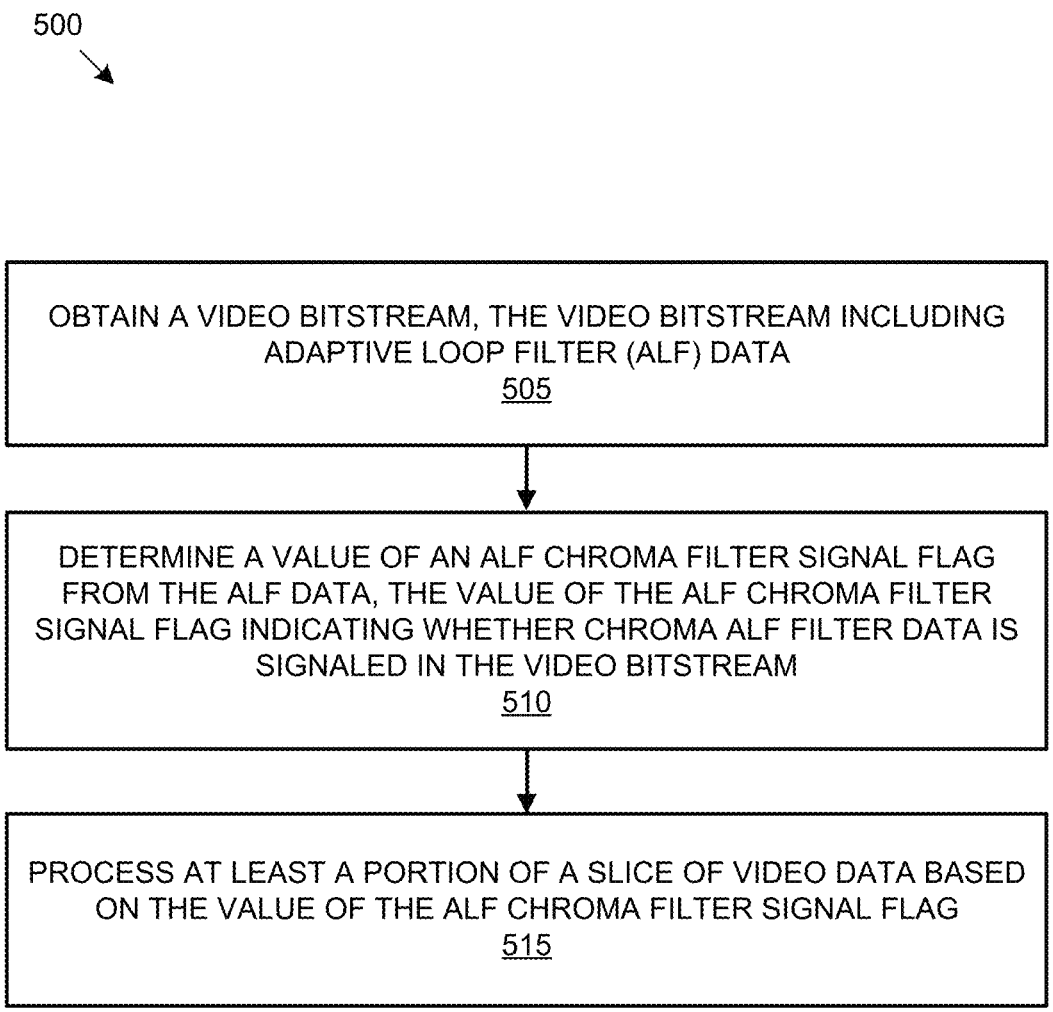
FIG. 5 is a flow diagram illustrating an example of a process for decoding video data, in accordance with some examples.

FIG. 5 illustrates a process 500 of decoding image and/or video data, in accordance with some examples. In some aspects, process 500 can be implemented in or by a system or apparatus with a memory and one or more processors configured to perform the operations of the process 500. In some aspects, the process 500 is implemented in instructions stored in a computer readable storage medium. For instance, the instructions, when processed by one or more processors of a coding system or apparatus (e.g., the system 100), cause the system or apparatus to perform the operations of the process 500. In other aspects, other implementations are possible in accordance with the details provided herein.

At block 505, process 500 includes obtaining a video bitstream. The video bitstream including adaptive loop filter (ALF) data. In one illustrative example, the ALF data can be signaled using the alf_data syntax structure described herein.

At block 510, process 500 includes determining a value of an ALF chroma filter signal flag from the ALF data. The value of the ALF chroma filter signal flag indicates whether chroma ALF filter data is signaled in the video bitstream. The ALF chroma filter signal flag can also be referred to herein as an ALF flag. In one illustrative example, the ALF chroma filter signal flag can include the alf_chroma_filter_signal_flag syntax element in the alf_data syntax structure described herein. In some cases, the ALF filter data can include ALF filter coefficients (e.g., f(k,l)) and/or other parameters. In some examples, the process 500 can include inferring that the value of the ALF chroma filter signal flag is zero when the value of the ALF chroma filter signal flag is not present in the ALF data. In some examples, the process 500 can include processing the value of the ALF chroma filter signal flag from the ALF data to determine that the chroma ALF filter data is signaled in the video bitstream.

At block 515, process 500 includes processing at least a portion of a slice of video data based on the value of the ALF chroma filter signal flag. The portion of the slice can include a block of the slice (e.g., a CTB, a CB, a CTU, a CB, etc.), multiple blocks of the slice (e.g., two or more CTBs, CBs, CTUs, CBs, etc.), or the entire slice. In some aspects, at least the portion of the slice includes 4:4:4 format video data or non-4:2:0 format video data. Various examples of processing at least the portion of the slice of video data are described herein.

In some examples, the process 500 can include obtaining a slice header (e.g., the slice_header( ) syntax structure described herein) for the slice of video data from the video bitstream. The process 500 can include determining a value of an ALF chroma identifier (also referred to herein as a slice ALF chroma identifier) from the slice header. The value of the ALF chroma identifier indicates whether an ALF can be applied to one or more chroma components of the slice. In one illustrative example, the ALF chroma identifier can include the slice_alf_chroma_idc syntax element included in the slice_header( ) syntax structure described herein. The process 500 can further include processing at least the portion of the slice based on the ALF chroma identifier from the slice header. In some cases, the process 500 can include determining a value of a chroma format identifier from the slice header (e.g., from the slice_header( ) syntax structure). For instance, the value of the chroma format identifier and the value of the ALF chroma identifier indicate which chroma component of the one or more chroma components the ALF is applicable. In one illustrative example, the chroma format identifier can include the ChromaArrayType variable described herein. In some aspects, the value of the ALF chroma filter signal flag (e.g. alf_chroma_filter_signal_flag syntax element in the alf_data syntax structure) indicates that the chroma ALF filter data is signaled in the video bitstream (e.g., and thus that ALF is available for one or more chroma components). In some cases, the chroma ALF filter data is signaled in an adaptation parameter set (APS) for processing at least the portion of the slice. In some examples, based on the value of the ALF chroma filter signal flag, the process 500 can include obtaining the chroma ALF filter data to be used for processing at least the portion of the slice. The process 500 can further include applying the chroma ALF filter data to at least the portion of the slice of video data.

In some examples, based on the value of the ALF chroma filter signal flag, the process 500 can include obtaining luma ALF filter data to be used for one or more chroma components of at least one block of the video bitstream. The process 500 can further include applying the luma ALF filter data to the one or more chroma components of the at least one block of the video bitstream.

In some examples, the process 500 can include obtaining a slice header for the slice of video data from the video bitstream. As noted above, the process 500 can include determining a value of a chroma format identifier from the slice header (e.g., a value of the ChromaArrayType variable from the slice_header( ) syntax structure). Based on the value of the chroma format identifier from the slice header, the process 500 can include processing one or more chroma components of at least one block of the video bitstream using luma ALF filter data.

As noted above, the process 500 can include processing the value of the ALF chroma filter signal flag from the ALF data to determine that the chroma ALF filter data is signaled in the video bitstream. In some examples, the process 500 can include determining an ALF application parameter set (APS) identifier for a first color component of at least the portion of the slice. The process 500 can further include determining an ALF map for the first color component of at least the portion of the slice. In one illustrative example, the ALF map can include or can be signaled using the slice_alf_chroma_map_signalled syntax element, the slice_alf_chroma2_map_signalled syntax element, and/or other syntax element describe above. In some examples, the process 500 can include enabling ALF filtering for at least two non-luma components of at least the portion of the slice based on components of at least the portion of the slice including shared characteristics. In some cases, the at least two non-luma components of at least the portion of the slice comprise a red component, a green component, and a blue component of at least the portion of the slice. In some cases, the at least two non-luma components of at least the portion of the slice comprise one or more chroma components (e.g., a Cb component and/or a Cr component) of at least the portion of the slice.

In some examples, the process 500 can include enabling ALF filtering for at least two non-luma components of at least the portion of the slice based on at least the portion of the slice including non-4:2:0 format video data.

As noted above, in some cases, at least the portion of the slice includes 4:4:4 format video data. In some examples, the process 500 can include determining a chroma type array variable for at least the portion of the slice. The process 500 can include determining an ALF chroma application parameter set (APS) identifier for a first component of at least the portion of the slice based on the chroma type array variable for at least the portion of the slice. The process 500 can include determining a signaled ALF map (e.g., the slice_alf_chroma_map_signalled syntax element, the slice_alf_chroma2_map_signalled syntax element, and/or other syntax element describe above) for the first component of at least the portion of the slice. In some examples, the process 500 can include determining a second signaled ALF map (e.g., the slice_alf_chroma_map_signalled syntax element, the slice_alf_chroma2_map_signalled syntax element, and/or other syntax element describe above) for a second component of at least the portion of the slice based on the chroma type array variable. In some examples, the process 500 can include performing ALF filtering on the first component and the second component of at least the portion of the slice using the signaled ALF map and the second signaled ALF map. In some examples, the process 500 can include determining a third signaled ALF map for a third component of at least the portion of the slice based on the chroma type array variable. In one illustrative example using the if(sps_alf_flag) syntax provided above, the signaled ALF map includes or is signaled using the slice_alf_map_signalled syntax element noted above, the second signaled ALF map includes or is signaled using the slice_alf_chroma_map_signalled syntax element noted above, and the third signaled ALF map is or is signaled using the slice_alf_chroma2_map_signalled syntax element noted above. In some cases, the first component is a luma component, the second component is a first chroma component, and the third component is a second chroma component. In some cases, the first component is a red component, the second component is a green component, and the third component is a blue component. In some examples, the process 500 can include performing ALF processing on a block for each component of at least the portion of the slice based on the chroma type array variable.

Figure 6:
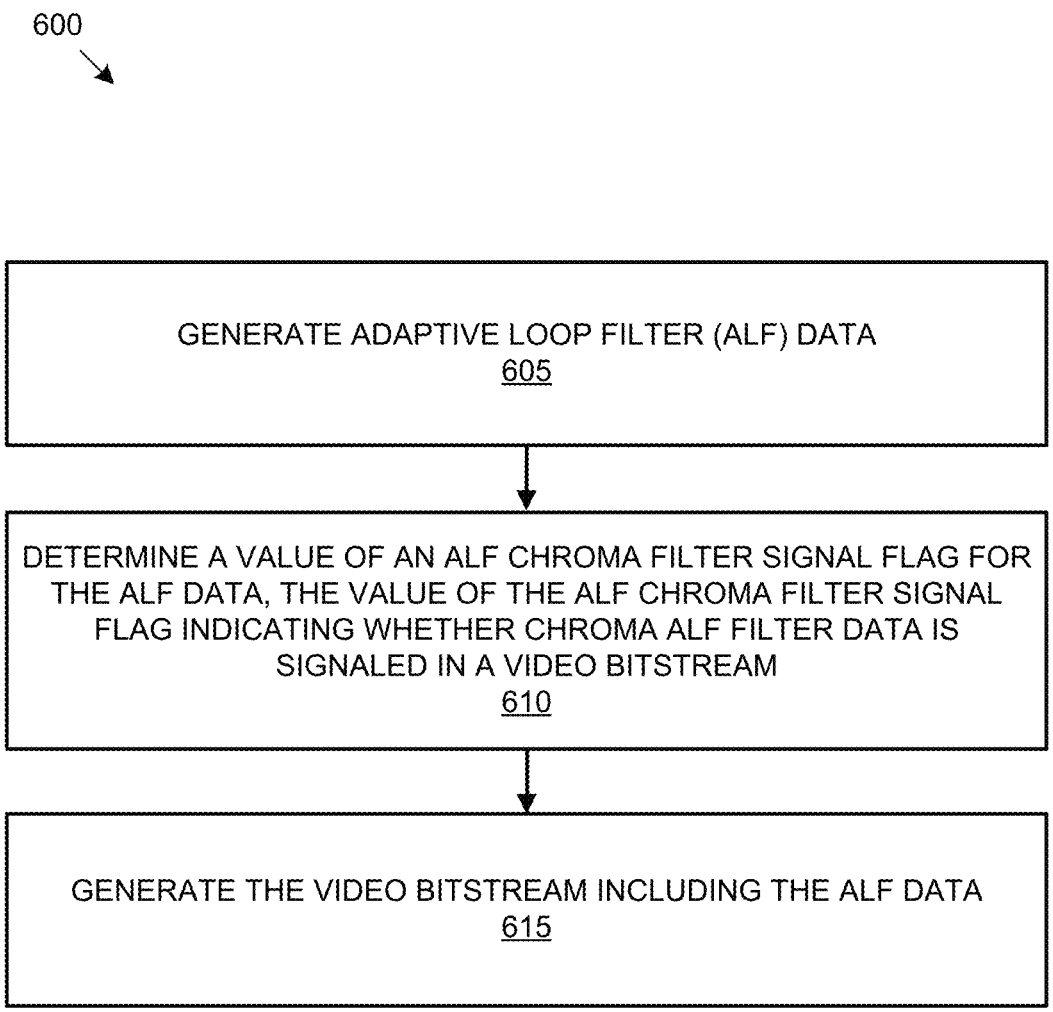
FIG. 6 is a flow diagram illustrating an example of a process for decoding video data, in accordance with some examples.

FIG. 6 illustrates a process 600 of encoding image and/or video data, in accordance with some examples. In some aspects, process 600 can be implemented in or by a system or apparatus with a memory and one or more processors configured to perform the operations of the process 600. In some aspects, the process 600 is implemented in instructions stored in a computer readable storage medium. For instance, the instructions, when processed by one or more processors of a coding system or apparatus (e.g., the system 100), cause the system or apparatus to perform the operations of the process 600. In other aspects, other implementations are possible in accordance with the details provided herein.

In block 605, process 600 includes generating adaptive loop filter (ALF) data. In one illustrative example, the ALF data includes the alf_data syntax structure described herein.

In block 610, process 600 includes determining a value of an ALF chroma filter signal flag for the ALF data. The value of the ALF chroma filter signal flag indicates whether chroma ALF filter data is signaled in a video bitstream. The ALF chroma filter signal flag can also be referred to herein as an ALF flag. In one illustrative example, the ALF chroma filter signal flag can include the alf_chroma_filter_signal_flag syntax element in the alf_data syntax structure described herein. In some cases, the ALF filter data can include ALF filter coefficients (e.g., f (k, l)) and/or other parameters.

In block 615, process 600 includes generating the video bitstream including the ALF data. The bitstream can be generated according to aspects described herein, such as those discussed with respect to FIG. 1, FIG. 7, and/or FIG. 8.

In some examples, the process 600 includes determining a value of an ALF chroma identifier (also referred to herein as a slice ALF chroma identifier). The value of the ALF chroma identifier indicates whether an ALF can be applied to one or more chroma components of a slice of video data. In one illustrative example, the ALF chroma identifier can include the slice_alf_chroma_idc syntax element included in the slice_header( ) syntax structure described herein. The process 600 can include (e.g., add) the value of the ALF chroma identifier in a slice header of the video bitstream. In one illustrative example, the slice header can include the slice_header( ) syntax structure described herein.

In some examples, the process 600 includes determining a value of a chroma format identifier. The value of the chroma format identifier and the value of the ALF chroma identifier can indicate which chroma component of the one or more chroma components the ALF is applicable. In one illustrative example, the chroma format identifier can include the ChromaArrayType variable described herein. The process 600 can include (e.g., add) the value of the chroma format identifier in the slice header of the video bitstream. In some aspects, the value of the ALF chroma filter signal flag indicates that the chroma ALF filter data is signaled in the video bitstream. In some cases, the chroma ALF filter data is signaled in an adaptation parameter set (APS) for processing at least the portion of the slice of video data.

As noted above, the process 600 includes determining a value of a chroma format identifier (e.g., a value of the ChromaArrayType variable from the slice_header( ) syntax structure). In some cases, the value of the chroma format identifier can indicate one or more chroma components of at least one block of the video bitstream to process using luma ALF filter data. The process 600 can include (e.g., add) the value of the chroma format identifier in a slice header of the video bitstream.

In addition to the aspects described above, it will be apparent that additional aspects are possible within the scope of the details provided herein. For example, repeated operations or intervening operations are possible within the scope of process 500 and related processes. Additional variations on the above processes will also be apparent from the details described herein. A non-exhaustive list of additional aspects is provided below:

In some implementations, the processes (or methods) described herein (including the process 500, the process 600, and/or other processes described herein) can be performed by a computing device or an apparatus, such as the system 100 shown in FIG. 1A. For example, the process 500 and/or the process 600 can be performed by the encoding device 104 shown in FIG. 1A and FIG. 7, by another video source-side device or video transmission device, by the decoding device 112 shown in FIG. 1A and FIG. 8, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes 500 and 600 are described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 500, the process 600, and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 7:
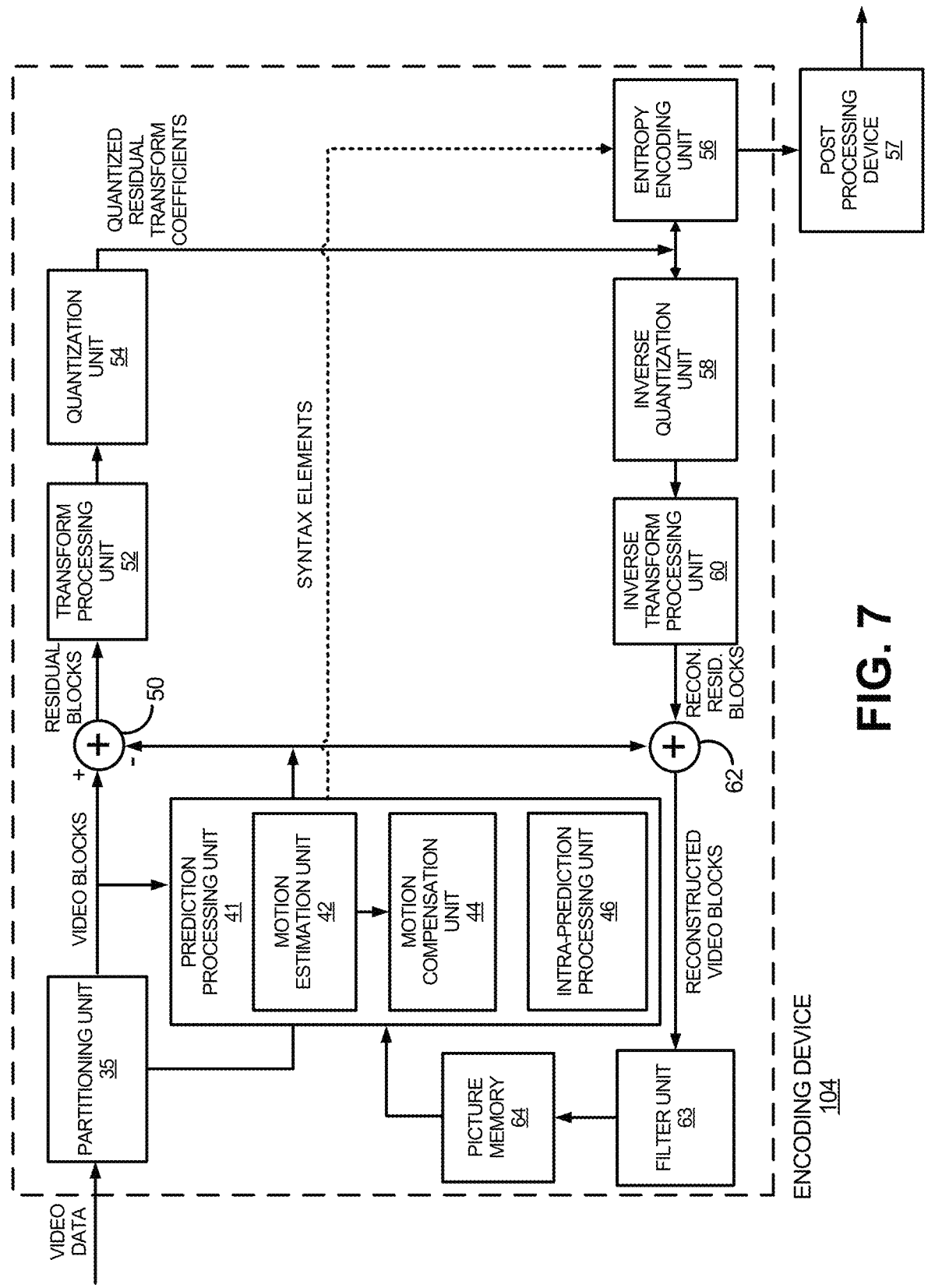
FIG. 7 is a block diagram illustrating an example video encoding device, in accordance with some examples.
Figure 8:
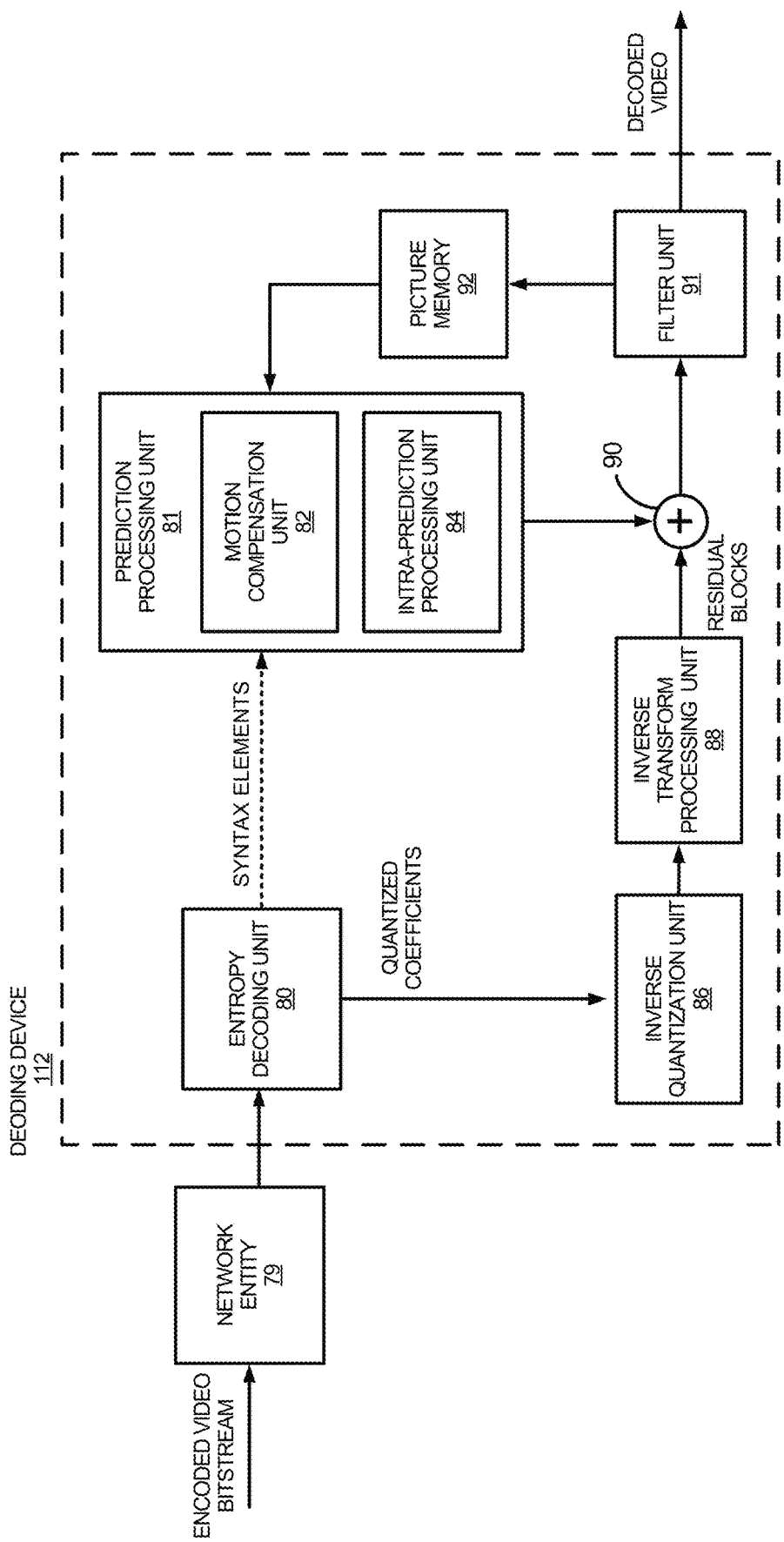
FIG. 8 is a block diagram illustrating an example video decoding device, in accordance with some examples.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to perform any of the techniques described herein, including the any of the processes or techniques described above. In some cases, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are stored in picture memory 92, which stores reference pictures used for subsequent motion compensation. Picture memory 92 also stores decoded video for later presentation on a display device, such as video destination device 122 shown in FIG. 1A.

In this manner, the decoding device 112 of FIG. 8 represents an example of a video decoder configured to perform any of the techniques described herein, including the processes or techniques described above.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for decoding video data, the apparatus comprising: a memory; and at least one processor (e.g., implemented in circuitry) coupled to the memory. The at least one processor is configured to: obtain a video bitstream, the video bitstream including adaptive loop filter (ALF) data; determine a value of an ALF chroma filter signal flag from the ALF data, the value of the ALF chroma filter signal flag indicating whether chroma ALF filter data is signaled in the video bitstream; and process at least a portion of a slice of video data based on the value of the ALF chroma filter signal flag.

Aspect 2. The apparatus of aspect 1, wherein the at least one processor is further configured to: obtain a slice header for the slice of video data from the video bitstream; determine a value of an ALF chroma identifier from the slice header, the value of the ALF chroma identifier indicating whether an ALF can be applied to one or more chroma components of the slice; and process at least the portion of the slice of video data based on the ALF chroma identifier from the slice header.

Aspect 3. The apparatus of aspect 2, wherein the at least one processor is further configured to: determine a value of a chroma format identifier from the slice header, the value of the chroma format identifier and the value of the ALF chroma identifier indicating which chroma component of the one or more chroma components the ALF is applicable.

Aspect 4. The apparatus of any of aspects 1 to 3, wherein the value of the ALF chroma filter signal flag indicates that the chroma ALF filter data is signaled in the video bitstream, and wherein the chroma ALF filter data is signaled in an adaptation parameter set (APS) for processing at least the portion of the slice of video data.

Aspect 5. The apparatus of any of aspects 1 to 4, wherein the at least one processor is configured to: based on the value of the ALF chroma filter signal flag, obtain the chroma ALF filter data to be used for processing at least the portion of the slice of video data; and apply the chroma ALF filter data to at least the portion of the slice of video data.

Aspect 6. The apparatus of any of aspects 1 to 5, wherein the at least one processor is configured to infer that the value of the ALF chroma filter signal flag is zero when the value of the ALF chroma filter signal flag is not present in the ALF data.

Aspect 7. The apparatus of any of aspects 1 to 6, wherein the at least one processor is configured to: based on the value of the ALF chroma filter signal flag, obtain luma ALF filter data to be used for one or more chroma components of at least one block of the video bitstream; and apply the luma ALF filter data to the one or more chroma components of the at least one block of the video bitstream.

Aspect 8. The apparatus of any of aspects 1 to 7, wherein the at least one processor is configured to: obtain a slice header for the slice of video data from the video bitstream; determine a value of a chroma format identifier from the slice header; and based on the value of the chroma format identifier from the slice header, process one or more chroma components of at least one block of the video bitstream using luma ALF filter data.

Aspect 9. The apparatus of any of aspects 1 to 8, wherein the at least one processor is further configured to: process the value of the ALF chroma filter signal flag from the ALF data to determine that the chroma ALF filter data is signaled in the video bitstream.

Aspect 10. The apparatus of any of aspects 1 to 9, wherein the at least one processor is further configured to: determine an ALF application parameter set (APS) identifier for a first color component of at least the portion of the slice; and determine an ALF map for the first color component of at least the portion of the slice.

Aspect 11. The apparatus of any of aspects 1 to 10, wherein the at least one processor is further configured to enable ALF filtering for at least two non-luma components of at least the portion of the slice based on components of at least the portion of the slice including shared characteristics.

Aspect 12. The apparatus of aspect 11, wherein the at least two non-luma components of at least the portion of the slice comprise a red component, a green component, and a blue component of at least the portion of the slice.

Aspect 13. The apparatus of aspect 11, wherein the at least two non-luma components of at least the portion of the slice comprise chroma components of at least the portion of the slice.

Aspect 14. The apparatus of any of aspects 1 to 13, wherein at least the portion of the slice of video data includes 4:4:4 format video data.

Aspect 15. The apparatus of any of aspects 1 to 14, wherein the at least one processor is configured to enable ALF filtering for at least two non-luma components of at least the portion of the slice based on at least the portion of the slice including non-4:2:0 format video data.

Aspect 16. The apparatus of any of aspects 1 to 15, wherein the at least one processor is configured to: determine a chroma type array variable for at least the portion of the slice; determine an ALF chroma application parameter set (APS) identifier for a first component of at least the portion of the slice based on the chroma type array variable for at least the portion of the slice; and determine a signaled ALF map for the first component of at least the portion of the slice.

Aspect 17. The apparatus of aspect 16, wherein the at least one processor is further configured to: determine a second signaled ALF map for a second component of at least the portion of the slice based on the chroma type array variable.

Aspect 18. The apparatus of aspect 17, wherein the at least one processor is configured to perform ALF filtering on the first component and the second component of at least the portion of the slice using the signaled ALF map and the second signaled ALF map.

Aspect 19. The apparatus of any of aspects 17 or 18, wherein the at least one processor is further configured to: determine a third signaled ALF map for a third component of at least the portion of the slice based on the chroma type array variable.

Aspect 20. The apparatus of aspect 19, wherein the first component is a luma component, wherein the second component is a first chroma component, and wherein the third component is a second chroma component.

Aspect 21. The apparatus of aspect 19, wherein the first component is a red component, wherein the second component is a green component, and wherein the third component is a blue component.

Aspect 22. The apparatus of any of aspects 16 to 21, wherein the at least one processor is configured to perform ALF processing on a block for each component of at least the portion of the slice based on the chroma type array variable.

Aspect 23. The apparatus of any of aspects 1 to 22, wherein the apparatus comprises a mobile device.

Aspect 24. The apparatus of any of aspects 1 to 23, further comprising a display configured to display one or more images.

Aspect 25. A method of decoding video data, comprising: obtaining a video bitstream, the video bitstream including adaptive loop filter (ALF) data; determining a value of an ALF chroma filter signal flag from the ALF data, the value of the ALF chroma filter signal flag indicating whether chroma ALF filter data is signaled in the video bitstream;

and processing at least a portion of a slice of video data based on the value of the ALF chroma filter signal flag.

Aspect 26. The method of aspect 25, further comprising: obtaining a slice header for the slice of video data from the video bitstream; determining a value of an ALF chroma identifier from the slice header, the value of the ALF chroma identifier indicating whether an ALF can be applied to one or more chroma components of the slice; and processing at least the portion of the slice based on the ALF chroma identifier from the slice header.

Aspect 27. The method of aspect 26, further comprising: determining a value of a chroma format identifier from the slice header, the value of the chroma format identifier and the value of the ALF chroma identifier indicating which chroma component of the one or more chroma components the ALF is applicable.

Aspect 28. The method of any of aspects 25 to 27, wherein the value of the ALF chroma filter signal flag indicates that the chroma ALF filter data is signaled in the video bitstream, and wherein the chroma ALF filter data is signaled in an adaptation parameter set (APS) for processing at least the portion of the slice.

Aspect 29. The method of any of aspects 25 to 28, further comprising: based on the value of the ALF chroma filter signal flag, obtaining the chroma ALF filter data to be used for processing at least the portion of the slice of video data; and applying the chroma ALF filter data to at least the portion of the slice of video data.

Aspect 30. The method of any of aspects 25 to 29, further comprising inferring that the value of the ALF chroma filter signal flag is zero when the value of the ALF chroma filter signal flag is not present in the ALF data.

Aspect 31. The method of any of aspects 25 to 30, further comprising: based on the value of the ALF chroma filter signal flag, obtaining luma ALF filter data to be used for one or more chroma components of at least one block of the video bitstream; and applying the luma ALF filter data to the one or more chroma components of the at least one block of the video bitstream.

Aspect 32. The method of any of aspects 25 to 31, further comprising: obtaining a slice header for the slice of video data from the video bitstream; determining a value of a chroma format identifier from the slice header; and based on the value of the chroma format identifier from the slice header, processing one or more chroma components of at least one block of the video bitstream using luma ALF filter data.

Aspect 33. The method of any of aspects 25 to 32, further comprising: processing the value of the ALF chroma filter signal flag from the ALF data to determine that the chroma ALF filter data is signaled in the video bitstream.

Aspect 34. The method of any of aspects 25 to 33, further comprising: determining an ALF application parameter set (APS) identifier for a first color component of at least the portion of the slice; and determining an ALF map for the first color component of at least the portion of the slice.

Aspect 35. The method of any of aspects 25 to 34, further comprising enabling ALF filtering for at least two non-luma components of at least the portion of the slice based on components of at least the portion of the slice including shared characteristics.

Aspect 36. The method of aspect 35, wherein the at least two non-luma components of at least the portion of the slice comprise a red component, a green component, and a blue component of at least the portion of the slice.

Aspect 37. The method of aspect 35, wherein the at least two non-luma components of at least the portion of the slice comprise chroma components of at least the portion of the slice.

Aspect 38. The method of any of aspects 25 to 37, wherein at least the portion of the slice includes 4:4:4 format video data.

Aspect 39. The method of any of aspects 25 to 38, further comprising enabling ALF filtering for at least two non-luma components of at least the portion of the slice based on at least the portion of the slice including non-4:2:0 format video data.

Aspect 40. The method of any of aspects 25 to 39, further comprising: determining a chroma type array variable for at least the portion of the slice; determining an ALF chroma application parameter set (APS) identifier for a first component of at least the portion of the slice based on the chroma type array variable for at least the portion of the slice; and determining a signaled ALF map for the first component of at least the portion of the slice.

Aspect 41. The method of aspect 40, further comprising: determining a second signaled ALF map for a second component of at least the portion of the slice based on the chroma type array variable.

Aspect 42. The method of aspect 41, further comprising performing ALF filtering on the first component and the second component of at least the portion of the slice using the signaled ALF map and the second signaled ALF map.

Aspect 43. The method of any of aspects 41 or 42, further comprising: determining a third signaled ALF map for a third component of at least the portion of the slice based on the chroma type array variable.

Aspect 44. The method of aspect 43, wherein the first component is a luma component, wherein the second component is a first chroma component, and wherein the third component is a second chroma component.

Aspect 45. The method of aspect 43, wherein the first component is a red component, wherein the second component is a green component, and wherein the third component is a blue component.

Aspect 46. The method of any of aspects 25 to 45, further comprising performing ALF processing on a block for each component of at least the portion of the slice based on the chroma type array variable.

Aspect 47. An apparatus for encoding video data, the apparatus comprising: a memory; and at least one processor (e.g., implemented in circuitry) coupled to the memory. The at least one processor is configured to: generate adaptive loop filter (ALF) data; determine a value of an ALF chroma filter signal flag for the ALF data, the value of the ALF chroma filter signal flag indicating whether chroma ALF filter data is signaled in a video bitstream; and generate the video bitstream including the ALF data.

Aspect 48. The apparatus of aspect 47, wherein the at least one processor is further configured to: determine a value of an ALF chroma identifier, the value of the ALF chroma identifier indicating whether an ALF can be applied to one or more chroma components of a slice of video data; and include the value of the ALF chroma identifier in a slice header of the video bitstream.

Aspect 49. The apparatus of aspect 48, wherein the at least one processor is further configured to: determine a value of a chroma format identifier, the value of the chroma format identifier and the value of the ALF chroma identifier indicating which chroma component of the one or more chroma components the ALF is applicable; and include the value of the chroma format identifier in the slice header of the video bitstream.

Aspect 50. The apparatus of any of aspects 47 to 49, wherein the value of the ALF chroma filter signal flag indicates that the chroma ALF filter data is signaled in the video bitstream, and wherein the chroma ALF filter data is signaled in an adaptation parameter set (APS) for processing at least the portion of the slice.

Aspect 51. The apparatus of any of aspects 47 to 50, wherein the at least one processor is configured to: determine a value of a chroma format identifier, wherein the value of the chroma format identifier indicates one or more chroma components of at least one block of the video bitstream to process using luma ALF filter data; and include the value of the chroma format identifier in a slice header of the video bitstream.

Aspect 52. The apparatus of any of aspects 47 to 51, wherein the apparatus comprises a mobile device.

Aspect 53. The apparatus of any of aspects 47 to 52, further comprising a display configured to display one or more images.

Aspect 54. A method of encoding video data, comprising: generating adaptive loop filter (ALF) data; determining a value of an ALF chroma filter signal flag for the ALF data, the value of the ALF chroma filter signal flag indicating whether chroma ALF filter data is signaled in a video bitstream; and generating the video bitstream including the ALF data.

Aspect 55. The method of aspect 54, further comprising: determining a value of an ALF chroma identifier, the value of the ALF chroma identifier indicating whether an ALF can be applied to one or more chroma components of a slice of video data; and including the value of the ALF chroma identifier in a slice header of the video bitstream.

Aspect 56. The method of aspect 55, further comprising: determining a value of a chroma format identifier, the value of the chroma format identifier and the value of the ALF chroma identifier indicating which chroma component of the one or more chroma components the ALF is applicable; and including the value of the chroma format identifier in the slice header of the video bitstream.

Aspect 57. The method of any of aspects 54 to 56, wherein the value of the ALF chroma filter signal flag indicates that the chroma ALF filter data is signaled in the video bitstream, and wherein the chroma ALF filter data is signaled in an adaptation parameter set (APS) for processing at least the portion of the slice.

Aspect 58. The method of any of aspects 54 to 57, further comprising: determining a value of a chroma format identifier, wherein the value of the chroma format identifier indicates one or more chroma components of at least one block of the video bitstream to process using luma ALF filter data; and including the value of the chroma format identifier in a slice header of the video bitstream.

Aspect 59. A computer-readable storage medium storing instructions that, when executed by one or more processors, cause the one or more processors to perform any of the operations of Aspects 1 to 46.

Aspect 60. An apparatus comprising means for performing any of the operations of Aspects 1 to 46.

Aspect 61. A computer-readable storage medium storing instructions that, when executed by one or more processors, cause the one or more processors to perform any of the operations of Aspects 47 to 58.

Aspect 62. An apparatus comprising means for performing any of the operations of Aspects 47 to 58.

Aspect 63. A computer-readable storage medium storing instructions that, when executed by one or more processors, cause the one or more processors to perform any of the operations of Aspects 1 to 58.

Aspect 64. An apparatus comprising means for performing any of the operations of Aspects 1 to 58.

What is claimed is:

1. An apparatus to decode video data, the apparatus comprising:
a memory configured to store the video data that has been decoded; and
at least one processor coupled to the memory and configured to:
obtain a video bitstream, the video bitstream including adaptive loop filter (ALF) data;
determine a value of an ALF chroma filter signal flag from the ALF data, the value of the ALF chroma filter signal flag indicating whether chroma ALF filter data is signaled in the video bitstream;
process the value of the ALF chroma filter signal flag from the ALF data to determine that the chroma ALF filter data is signaled in the video bitstream;
determine a chroma type array variable for the at least the portion of the slice of video data;
determine an ALF chroma application parameter set (APS) identifier for the first of the one or more the chroma components of at least portion of the slice of video data based on the chroma type array variable for the at least the portion of the slice of video data;
determine a signaled ALF map for the first one of the one or more chroma components of the at least the portion of the slice of the video data based on the chroma type array variable;
enable ALF filtering for a first of one or more chroma components of at least a portion of a slice of video data; and
process the one or more chroma components of the at least the portion of the slice of video data based on the value of the ALF chroma filter signal flag.

2. The apparatus of claim 1, wherein the at least one processor is further configured to:
obtain a slice header for at least the portion of the slice of video data from the video bitstream;
determine a value of an ALF chroma identifier from the slice header, the value of the ALF chroma identifier indicating whether an ALF can be applied to one or more chroma components of the at least the first portion of the slice of video data; and
process the one or more chroma components of the at least the portion of the slice of video data based on the ALF chroma identifier from the slice header.

3. The apparatus of claim 2, wherein the value of the ALF chroma filter signal flag indicates that the chroma ALF filter data is signaled in the video bitstream, and wherein the chroma ALF filter data is signaled in an adaptation parameter set (APS) for processing the one or more chroma components of the at least the portion of the slice of video data.

4. The apparatus of claim 1, wherein the at least one processor is configured to infer that the value of the ALF chroma filter signal flag is zero when the value of the ALF chroma filter signal flag is not present in the ALF data.

5. The apparatus of claim 1, wherein the at least the portion of the slice of video data includes 4:2:0 format video data or 4:2:2 format video data.

6. The apparatus of claim 1, wherein the at least the portion of the slice of video data includes 4:4:4 format video data.

7. The apparatus of claim 1, wherein the enable ALF filtering for a first one of the one or more chroma components of the at least the portion of the slice of video data is based on the at least the portion of the slice of video data that includes non-4:2:0 format video data.

8. The apparatus of claim 1, wherein the at least one processor is further configured to:
determine a second signaled ALF map for a second one of the one or more chroma components of the at least the portion of the slice of video data is based on the chroma type array variable.

9. The apparatus of claim 8, wherein the at least one processor is configured to perform ALF filtering on the first one of the one or more chroma components and the second one of the one or more chroma components of the at least the portion of the slice of video data using the signaled ALF map and the second signaled ALF map.

10. The apparatus of claim 1, wherein the apparatus comprises a mobile device.

11. The apparatus of claim 1, further comprising a display configured to display one or more images based on the one or more chroma components.

12. A method of decoding video data, comprising:
obtaining a video bitstream, the video bitstream including adaptive loop filter (ALF) data;
determining a value of an ALF chroma filter signal flag from the ALF data, the value of the ALF chroma filter signal flag indicating whether chroma ALF filter data is signaled in the video bitstream;
processing the value of the ALF chroma filter signal flag from the ALF data to determine that the chroma ALF filter data is signaled in the video bitstream;
determining a chroma type array variable for the at least the portion of the slice of video data;
determining an ALF chroma application parameter set (APS) identifier for a first of the one or more the chroma components of at least portion of the slice of video data based on the chroma type array variable for the at least the portion of the slice of video data;
determining a signaled ALF map for the first one of the one or more chroma components of the at least the portion of the slice of the video data based on the chroma type array variable;
enabling ALF filtering for a first of one or more chroma components of at least a portion of a slice of video data; and
processing the one or more chroma components of the at least the portion of the slice of video data based on the value of the ALF chroma filter signal flag.

13. The method of claim 12, further comprising:
obtaining a slice header for the at least the portion of the slice of video data from the video bitstream;
determining a value of an ALF chroma identifier from the slice header, the value of the ALF chroma identifier indicating whether an ALF can be applied to the one or more-chroma components of the at least the portion of the slice of video data; and
processing the one or more chroma components of the at least the portion of the slice based on the ALF chroma identifier from the slice header.

14. The method of claim 13, wherein the value of the ALF chroma filter signal flag indicates that the chroma ALF filter data is signaled in the video bitstream, and wherein the chroma ALF filter data is signaled in an adaptation parameter set (APS) for processing the one or more chroma components of the at least the portion of the slice.

15. The method of claim 12, further comprising inferring that the value of the ALF chroma filter signal flag is zero when the value of the ALF chroma filter signal flag is not present in the ALF data.

16. The method of claim 12, further comprising:
processing the value of the ALF chroma filter signal flag from the ALF data to determine that the chroma ALF filter data is signaled in the video bitstream.

17. The method of claim 12, wherein
the at least the portion of the slice of video data includes 4:2:0 format video data or 4:2:2 format video data.

18. The method of claim 12, wherein the at least the portion of the slice of video data includes 4:4:4 format video data.

19. The method of claim 18, wherein the enabling ALF filtering for the one or more chroma components of the at least the portion of the slice of video data is based on the at least the portion of the slice of video data that includes non-4:2:0 format video data.

20. The method of claim 12, further comprising:
determining a second signaled ALF map fora second one of the one or more components of the at least the portion of the slice of video data is based on the chroma type array variable.

21. The method of claim 20, further comprising performing ALF filtering on the first one of the one or more chroma components and the second one of the one or more components of the at least the portion of the slice of video data using the signaled ALF map and the second signaled ALF map.

22. An apparatus to encode video data, the apparatus comprising:
a memory configured to store encoded video data; and
at least one processor coupled to the memory and configured to:
generate adaptive loop filter (ALF) data;
determine a value of an ALF chroma filter signal flag for the ALF data, the value of the ALF chroma filter signal flag indicating whether chroma ALF filter data is signaled in a video bitstream;
process the value of the ALF chroma filter signal flag from the ALF data to determine that the chroma ALF filter data is signaled in the video bitstream;
determine a chroma type array variable for the at least the portion of the slice of video data;
determine an ALF chroma application parameter set (APS) identifier for a first of the one or more the chroma components of at least portion of the slice of video data based on the chroma type array variable for the at least the portion of the slice of video data; and
determine a signaled ALF map for the first one of the one or more chroma components of the at least the portion of the slice of the video data based on the chroma type array variable;
enable ALF filtering for a first of one or more chroma components of at least a portion of a slice of video data; and
process the one or more chroma components of the at least the portion of the slice of video data based on the value of the ALF chroma filter signal flag.

* * * * *